United States Patent [19]
Atkinson et al.

[11] Patent Number: 5,956,251
[45] Date of Patent: Sep. 21, 1999

[54] STATISTICAL TOLERANCING

[75] Inventors: Robert E. Atkinson; Teresa S. Miller, both of Wichita, Kans.; Friedrich-Wilhelm Scholz, Shoreline, Wash.

[73] Assignee: The Boeing Company, Seattle, Wash.

[21] Appl. No.: 08/981,792

[22] PCT Filed: Jun. 21, 1996

[86] PCT No.: PCT/US96/10757

§ 371 Date: Dec. 4, 1997

§ 102(e) Date: Dec. 4, 1997

[87] PCT Pub. No.: WO97/01802

PCT Pub. Date: Jan. 16, 1997

Related U.S. Application Data

[60] Provisional application No. 60/000,593, Jun. 28, 1995, provisional application No. 60/003,725, Sep. 13, 1995, and provisional application No. 60/016,206, Apr. 22, 1996.

[51] Int. Cl.$^6$ ............................ G05B 19/418; G07C 3/14
[52] U.S. Cl. .............................. 364/468.16; 364/468.01; 702/81; 702/179
[58] Field of Search ............................... 364/148.06, 153, 364/154, 156, 468.01, 468.03, 468.09, 468.16, 474.17, 512, 578; 702/81, 82, 84, 179; 29/33 P

[56] References Cited

U.S. PATENT DOCUMENTS

| | | | |
|---|---|---|---|
| 5,337,462 | 8/1994 | Hedman | 29/33 P |
| 5,581,466 | 12/1996 | Van Wyk et al. | 364/468.01 |

OTHER PUBLICATIONS

"Review of Statistical Approaches to Tolerance Analysis" Nigam & Turner, Computer Aided Design, Jan. 95, pp. 6–15.
"Six Sigma Design and Statistical Tolerance Analysis" Sehlhorst, TI Technical Journal, Dec. 1995, pp. 54–63.
"Feature–based Modelling Approaches for Integrated Manufacturing; State–of–the–Art Survey and Future Research Directions" Allada & Anand, 1995, pp. 411–440.
"Case Study in Statistical Tolerancing" Altschul & Scholz, Manufacturing Review Mar. 1994, pp. 52–56.

(List continued on next page.)

*Primary Examiner*—William Grant
*Assistant Examiner*—Steven R. Garland
*Attorney, Agent, or Firm*—J. Michael Neary

[57] ABSTRACT

A process of establishing valid statistical dimensional tolerance limits for designs of detail parts that will enable accurate prediction of an economically acceptable degree of non-conformance of a large flexible end item assembly, having a set of predetermined dimensional tolerances, made from the detail parts, wherein the detail part tolerances are enlarged substantially compared to tolerances that would be necessary using an arithmetic "worst case" approach to remain within the end assembly tolerances while remaining within preestablished stress limits of the parts. A preferred assembly sequence for assembling the parts into the assembly is selected and validated. Locations, numbers and size of coordination features to be machined in said detail parts are selected, by which the parts are located relative to each other and fastened together to form the assembly. Individual part statistical dimensional tolerances are established as a fabrication requirement for the parts that enable the parts to be economically produced and assembled into assemblies that meet the predetermined assembly dimensional tolerances. The parts are produced to the individual statistical dimensional tolerances in a capable process, having a Cpk equal to at least 1.0, while holding the mean values of the statistically determined dimensions of the individual parts to within a predetermined percentage of the nominal dimension. The end item is assembled in accordance with the preferred assembly sequence by locating the parts relative to each other by reference to the coordination features as the primary determinator of assembly configuration.

26 Claims, 11 Drawing Sheets

OTHER PUBLICATIONS

"Represenation of Geometric Variations Using Matrix Transforms for Statistical Tolerance Analysis in Assemblies" Whitney & Gilbert, 1995, pp. 314–321.

"Toleranzsimulationen an Feinwerktechnischen Elementen" Klein & Mannewitz, 1994, pp. 441–446.

"Chemical Engineers' Handbook" Fifth Edition, Perry & Chilton, pp. 1–38 thru 1–40 and 2–62 thru 2–76, 1973.

Fig. 8
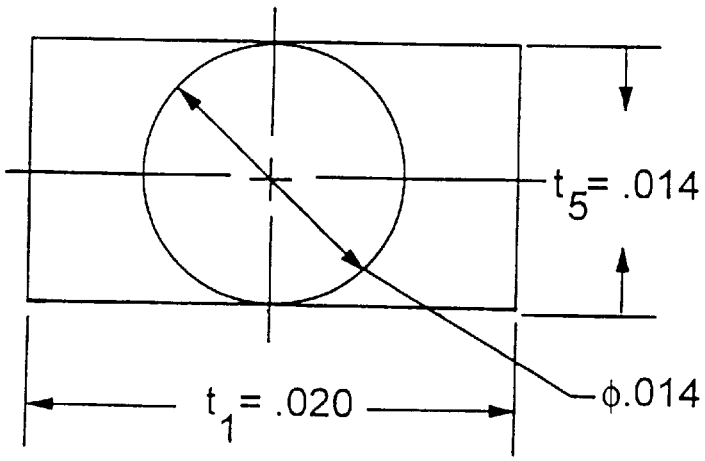
Fig. 9
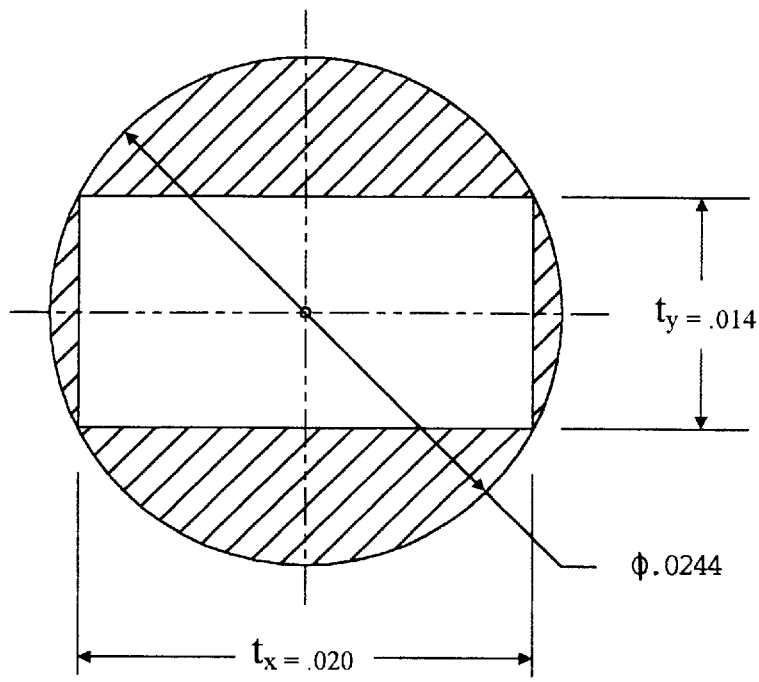
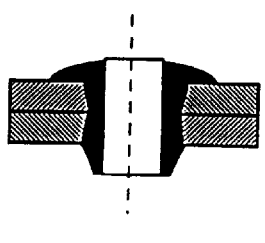
Fig. 10A
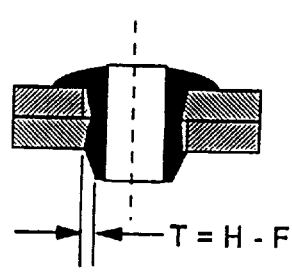
Fig. 10B

/1 Arithmetic tolerance requirement
/2 Statistical specification limits for computing Cpk
/3 Average of actual data must fall within these limits to comply with mean shift requirement

STATISTICAL TOLERANCING

This application claims benefit of PCT Application No. PCT/US96/10757, filed Jun. 21, 1996, which claims priority to U.S. Provisional Application Ser. No. 60/000,593, filed Jun. 28, 1995; U.S. Provisional Application Ser. No. 60/003,725, filed Sep. 13, 1995; and U.S. Provisional Application Ser. No. 60/016,206, filed Apr. 22, 1996.

This invention relates to methods for meeting end item/assembly tolerance criteria for large flexible parts, and for identifying the tolerance path starting with the end item/assembly feature through all detail parts in the path, and for selecting tolerances of detail part locating features in the tolerance path. It also considers the relationship of part tolerances to tool tolerances, and the use of a modifying factor to account for detail part process mean shifts.

BACKGROUND OF THE INVENTION

Traditional arithmetic tolerancing simply adds all the tolerances in a tolerance stack-up at the extremes of the drawing tolerances to predict a "worst case" assembly variation. It is important to note that if parts are built within tolerance and the assembly was correctly analyzed, a worst case approach assures 100% good assemblies.

Statistical tolerancing takes advantage of the fact that assemblies rarely or never stack in a worst case manner, and accepts the possibility that a small percentage of assemblies will fail to meet tolerance requirements. Under this approach, the tolerances of the detail parts can be increased because it can be shown that the statistical chance of worst case tolerance accumulation is small. Analysis indicates that the economic advantage accruing from the use of statistical tolerancing and the larger detail tolerances they make possible exceeds the cost of reworking or even scrapping the few assemblies that fail to meet the tolerance requirements. When statistical tolerancing is used to develop drawing requirements, both the design calculations and part inspection plans are more involved so normally only critical dimensions will be statistically controlled.

An assembly method known as "determinant assembly" is an approach to the production of large flexible parts and assemblies, such as airplanes, that eliminates the use of most traditional "hard tooling." An example of "determinant assembly" used to make airplane fuselage panels and fuselages is disclosed in U.S. patent application Ser. No. 07/964,533, now U.S. Pat. No. 5,560,102 entitled "Panel and Fuselage Assembly" filed on Oct. 13, 1992, by Micale and Strand. Another example of "determinant assembly" used in the airplane industry, this time to make airplane wings, is disclosed in U.S. Provisional Application 60/013,986 entitled "Determinant Wing Assembly" filed on Mar. 22, 1996, by Munk and Strand. To ensure that the assemblies, designed using the determinant assembly method, can be assembled successfully, tolerances should be analyzed to insure that the specified drawing tolerances will be producible and will support the preferred manufacturing plan/assembly sequence. Typical tolerance stack-ups for airplane assemblies require that a statistical tolerance analysis be performed in order to predict good assemblies made with producible detail part tolerances.

The "population" of manufactured parts, as used herein, is a term used to describe sets of numbers or values, consisting of measurements or observations about those parts. Populations of parts and the measurements thereof are described herein by distributions of these values. Such a description is usually given in terms of a frequency distribution, a probability distribution, or a density function with values given by f(x). Two parameters used to describe a population are its mean $\mu$ and its standard deviation $\sigma$, wherein $\sigma^2$ called the population variance. These parameters characterize the center or location of a population and the variation around the center. More specifically, these parameters are defined in terms of f(x) by $$\mu = \begin{cases} \Sigma_x x f(x) & \text{discrete} \\ \int x f(x) dx & \text{continuous} \\ \approx \Sigma_x x f(x) \Delta x \end{cases}$$

$$\sigma^2 = \begin{cases} \Sigma_x (x - \mu)^2 f(x) & \text{discrete} \\ \int (x - \mu)^2 f(x) dx & \text{continuous} \\ \approx \Sigma_x (x - \mu)^2 f(x) \Delta x \end{cases}$$

In the discrete case the population consists of many finite values and in the continuous case the population is so large that it is more conveniently represented by a continuum of values and the distribution of values is described by a density function f(x). If the population is normally distributed, part measurements will distribute and divide approximately in the proportions as shown in FIG. 1.

It is often impractical or uneconomical to observe a very large population in its entirety. Instead, one obtains a random sample and, based on an examination of this random sample, one infers characteristics of interest about the full population. The purpose of most statistical investigations is to generalize from information contained in random samples characteristics of the population from which such samples are drawn. For example, in making inferences about the population parameters $\mu$ and $\sigma^2$ based on a random sample $X_1, \ldots, X_n$ one calculates the corresponding sample estimates, namely the sample mean $$\overline{X} = \frac{X_1 + X_2 + \ldots + X_n}{n} = \frac{1}{n} \sum_{j=1}^{n} X_i$$

and the sample variance $$S^2 = \frac{(X_1 - \overline{X})^2 + (X_2 - \overline{X})^2 + \ldots + (X_n - \overline{X})^2}{n - 1} = \frac{1}{n - 1} \sum_{j=1}^{n} (X_j - \overline{X})^2$$

Here the divisor n−1 in the definition of $S^2$ is motivated by a technical concern of unbiasedness in the estimator $S^2$. In large samples it matters little whether one divides by n or by n−1.

A basic assumption of the statistical tolerance analysis approach discussed herein is that features of the produced parts can be described with a normal distribution. The probability density function for a normal distribution is $$f(x) = f_{\mu,\sigma}(x) = \frac{1}{\sqrt{2\pi}\sigma} e^{\frac{1}{2}[(x-\mu)/\sigma]^2}$$

The total area under the normal curve from x=−∞ to x=+∞ is equal to one; the area under f(x) between any two points a and b (a≦b) is the proportion of part features between a and b.

Since the normal probability density function cannot be integrated in closed form between any pair of limits, probabilities or proportions of part features between such limits are usually obtained from tables of the standard normal distribution with mean $\mu=0$ and standard deviation $\sigma=1$. This is done by way of the following standardization:

If X represents a random element from a normal population with mean $\mu$ and standard deviation $\sigma$, then the population proportion of such elements falling within [a,b] is $$P(a \le X \le b) = P\left(\frac{a-\mu}{\sigma} \le \frac{X-\mu}{\sigma} \le \frac{b-\mu}{\sigma}\right)$$
$$= P\left(\frac{a-\mu}{\sigma} \le Z \le \frac{b-\mu}{\sigma}\right)$$
$$= \Phi\left(\frac{a-\mu}{\sigma}\right) - \Phi\left(\frac{b-\mu}{\sigma}\right)$$

where $Z=(X-\mu)/\sigma$ is a random element from a standard normal distribution and $\Phi(z)$ denotes the tabulated area under the standard normal density to the left of Z, i.e., $$\Phi(z) = \int_{-\infty}^{z} \frac{1}{\sqrt{2\pi}} e^{-t^2/2} dt$$

with standard normal density $$\varphi(z) = f_{0,1}(z) = \frac{1}{\sqrt{2\pi}} e^{-z^2/2}$$

The most common statistical analysis case that arises in design occurs when random elements from two or more populations are combined in some specified manner. Determinant assembly techniques are usually concerned with assembling parts whose tolerances stack linearly, i.e., $$X_{assy} = a_1 X_1 + a_2 X_2 + \ldots + a_n X_n$$

usually with coefficients $a_i=1$ or $a_i=-1$, depending on the direction of action of the $i^{th}$ element in the tolerance chain. When random elements from two or more populations are combined in a linear fashion they form a new and derived population with mean and variance given by $$\mu_{assy} = a_1 \mu_1 + a_2 \mu_2 + \ldots + a_n \mu_n$$
and
$$\sigma_{assy}^2 = a_1^2 \sigma_1^2 + a_2^2 \sigma_2^2 + \ldots + a_n^2 \sigma_n^2$$
$$= \sigma_1^2 + \sigma_2^2 + \ldots + \sigma_n^2$$

the latter simplification arising when $a_i^2=1$ for all i. The resultant standard deviation is the square root of $\sigma^2_{assy}$.

Typically, statistical tolerancing is based on several assumptions:

Variations in part dimensions have a normal distribution.
Production process is in statistical control (all variations occur at random).
Process spread is equal to plus or minus three standard deviations, $6\sigma$. For a normally distributed population, 99.73% of the production parts will be within the process spread.

Statistical Process Control (SPC) provides standardized techniques to monitor manufacturing processes and verify process control and capability. To determine if the process is "capable," it is necessary to develop methods to calculate whether the variation is too large or if the process mean has shifted too far from nominal.

Once the detail part specification limits have been established and the natural variability of the process has been determined, the capability ratio, Cp, can be calculated as follows;

$$Cp = \frac{\text{specification width}}{\text{process width}} = \frac{USL - LSL}{6\sigma}$$

where USL and LSL are the upper and lower specification limits. The Cp capability ratio assumes that the measurements are normally distributed, but does not take into account the centering of data relative to the target value. It is simply the ratio of tolerance requirements to process capability.

The process capability index, Cpk, is a standard measure of process capability over an extended period of time for a process exhibiting statistical control. Cpk is considered to be a reliable indicator of process performance, taking into account process variation and deviation from nominal, $$\frac{(USL + LSL)}{2}.$$

Cpk can be calculated as follows;

$$Cpk = \text{minimum of } \frac{USL - \overline{X}}{3\sigma} \text{ and } \frac{LSL - \overline{X}}{3\sigma}$$

To determine whether a process is in statistical control, enough measurements are needed to allow all potential sources or variation to be represented. For any given period of time, a process characteristic will be considered in statistical control if all the plotted points in that period of time fall inside the control limits ($\pm 3\sigma$ limits).

When the process is centered within the specification limits, then Cp=Cpk. The following table shows the percent process fallout for shifts in Cpk for various values of Cp. The table considers shifts in the process from the center of the specification limits. To reduce the number of defective detail parts, the process can be centered or the variability can be reduced, or both can be done.

Percent Process Fallout For Shifts in Cpk from Various Values of Cp

| | Shift in Cpk (Cp - Cpk) | | |
|---|---|---|---|
| Cp | 0.00 | 0.20 | 0.40 |
| .50 | 13.361 | 20.193 | 38.556 |
| 1.00 | .270 | .836 | 3.594 |
| 1.20 | .0318 | .1363 | .8198 |
| 1.40 | .0027 | .0160 | .1350 |

Three approaches to tolerance analysis are available for use for determinant assembly:
1. Worst Case (Arithmetic)
2. Simulation Analysis
3. Modified Root Sum Square (RSS)

Selection of part datums and tolerance stack-up are the same for all methods. How we treat the part variation in the analysis is different for each approach.

The worst case analysis approach is well understood. It is simply the arithmetic sum of all tolerance contributors in an assembly stack-up. It is a conservative approach, requiring no knowledge about the individual detail part variation distribution since theoretically all parts could be made at either specification limit and the assembly will be within tolerance every time. This is the simplest analysis and most desirable from a fabrication standpoint since no knowledge is required about the part variation. If the calculated worst case tolerances are producible and predict a good assembly, these tolerances should be used.

A number of tolerance analysis software programs using statistical simulation techniques are available to predict the amount of variation that can occur in an assembly due to specified design tolerances, tool tolerances, and manufacturing/assembly variation. Some programs can determine the major contributing factors of the predicted variation and their percentage of contribution.

Simulation begins with a mathematical model of the assembly. Often data from a computer aided design program is an input to the model. The model includes detail geometry, tolerance variations (design and process) and the assembly sequence. The model simulates the production of a specified number of assemblies. During the simulations, the dimensions on each of the parts being assembled and on the assembly fixtures are randomly varied within the tolerances and statistical distributions specified. Output characteristics of interest are measured on the assemblies and the results are analyzed statistically.

The statistical analysis performed will give the percent of production assemblies that will be out of specification. The simulation can then be used to determine the major items contributing to the variation. Problem corrections can be identified and incorporated into the model. Additional simulations can be run to determine the effectiveness of the solution.

Three dimensional simulation programs require trained operators and dedicated equipment. Use is primarily limited to complicated structure or areas highly subject to change which is more difficult to analyze using the other more simplified approaches.

The RSS method of tolerance analysis is based on the assumption that tolerances stack linearly. Traditionally, the total tolerance band is set to $6\sigma$ of the detail process capability. Therefore, the tolerance band can be expressed in terms of the standard deviation.

$$\pm t_{detail} = \pm 3\sigma_{detail}$$

$$\pm \sigma_{detail} = \frac{\pm t_{detail}}{3}$$

In the previous discussion on normal distributions, it was noted that for a linear stack $$X_{assy} = a_1 X_1 + a_2 X_2 + \ldots + a_n X_n$$

we have $$\sigma_{assy} = \sqrt{a_1^2 \sigma_1^2 + a_2^2 \sigma_2^2 + \ldots + a_n^2 \sigma_n^2}$$

Therefore $$\frac{1}{3} T^*_{assy} = \sigma_{assy} = \sqrt{a_1^2 (t_1/3)^2 + a_2^2 (t_2/3)^2 + \ldots + a_n^2 (t_n/3)^2}$$

$$= \frac{1}{3} \sqrt{a_1^2 t_1^2 + a_2^2 t_2^2 + \ldots + a_n^2 t_n^2}$$

and thus $$T^*_{assy} = \sqrt{a_1^2 t_1^2 + a_2^2 t_2^2 + \ldots + a_n^2 t_n^2}$$

resulting in the well known root sum square (RSS) or statistical tolerance stacking formula.

Use of the RSS method of tolerance analysis has been observed to optimistically establish wider detail part tolerances and underestimate assembly variation. Thus, there has long been a need for a process for establishing valid detail part dimensional tolerance limits that will enable accurate prediction of an economically acceptable degree of non-conformance of a large flexible assembly made from said parts, especially in a process that accounts for detail part mean shifts of limited amounts in the process value of interest.

SUMMARY OF THE INVENTION

Accordingly, it is an object of this invention to provide an improved process for establishing valid part dimensional tolerance limits that will enable accurate prediction of an economically acceptable degree of dimensional or fit non-conformance of large flexible assemblies, such as airplane structure, made from such parts. Another object of this invention is to provide an improved process of assembling a large flexible structure from a plurality of individual parts, some of which are flexible, while remaining within established preload stress limits of the parts. Still another object of this invention is to provide an improved large flexible assembly having a predetermined set of dimensional tolerances, made from a plurality of parts each having a set of individual part tolerances that are substantially more relaxed than conventional "worst case" tolerances. A further object of this invention is to provide a process which facilitates manufacture of improved parts for an airplane that are predrilled and trimmed for replacement of parts in airplanes made in accordance with this invention, so that the parts fit and the holes line up without the necessity of back drilling, shimming or trimming to fit. An additional object of this invention is to allow for a some trade-off between increased mean shift for increased detail part Cpk in the manufacture of detail parts without increasing the predicted amount of non-conformance of the assemblies.

These and other objects of the invention are attained in a process for establishing valid detail part dimensional tolerance limits that will enable accurate prediction of an economically acceptable degree of non-conformance of a large flexible assembly made from the parts, including establishing dimensional tolerances for the assembly, and allocating the assembly dimensional tolerance among all the detail parts in the stack-up to establish a first estimate of detail part tolerances. A preferred assembly sequence for assembling the parts into the assembly, including reliable detail part fabrication processes is selected and validated. The detail part dimensional tolerance limits are increased from what a worst case tolerance analysis would require, based on an assumption that the tolerances rarely add in a worst case combination and that an economically acceptable rate of non-conforming assemblies is preferable to the economic cost of producing parts with tolerances based on worst case tolerancing analysis.

DESCRIPTION OF THE DRAWINGS

The invention and its many attendant objects and advantages will become better understood upon reading the following description of the preferred embodiment in conjunction with the following drawings, wherein:

FIGS. 7 and 8 are diagrams illustrating tolerance zones calculated using the assembly analysis approach in accordance with this invention;

FIG. 9 is an incorrect detail part drawing interpretation of a statistically derived bilateral tolerance requirement for determinant assemblies;

FIGS. 10A and 10B shows cross-sectional views of aligned and misaligned parts with temporary blind rivets installed;

DESCRIPTION OF THE PREFERRED EMBODIMENT

Figure 1:
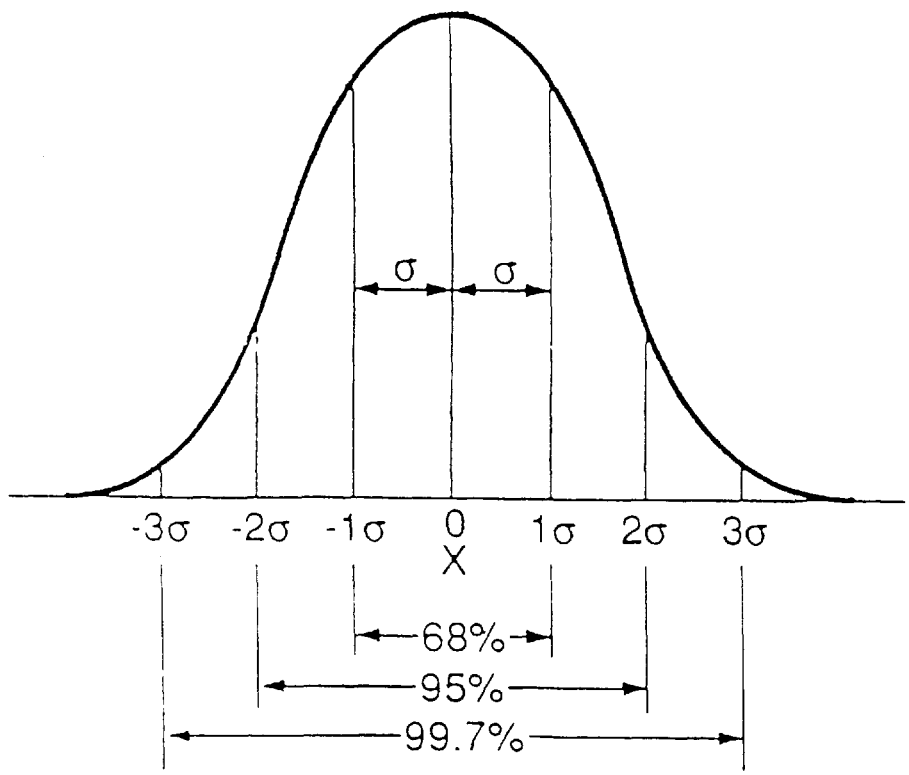
FIG. 1 is a graph showing the distribution of part measurements in a normally distributed population, and showing the proportions of the population within $\pm 1\sigma$, $\pm 2\sigma$, and $\pm 3\sigma$.
Figure 2:
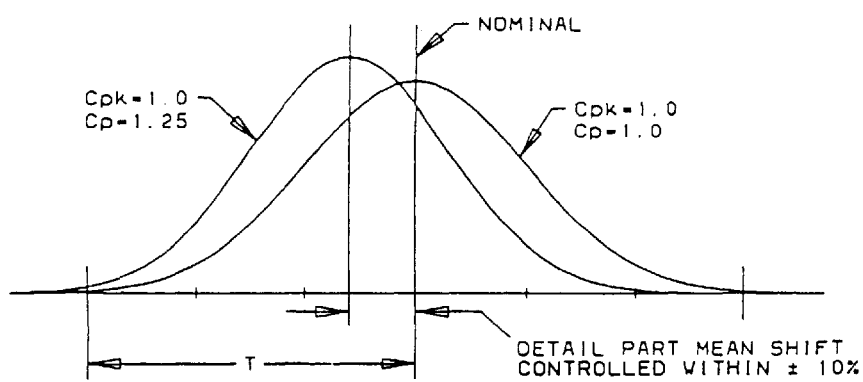
FIG. 2 is a graph showing a centered normal distribution and a distribution shifted by 10%, both with a Cpk=1.0.
Figure 3:
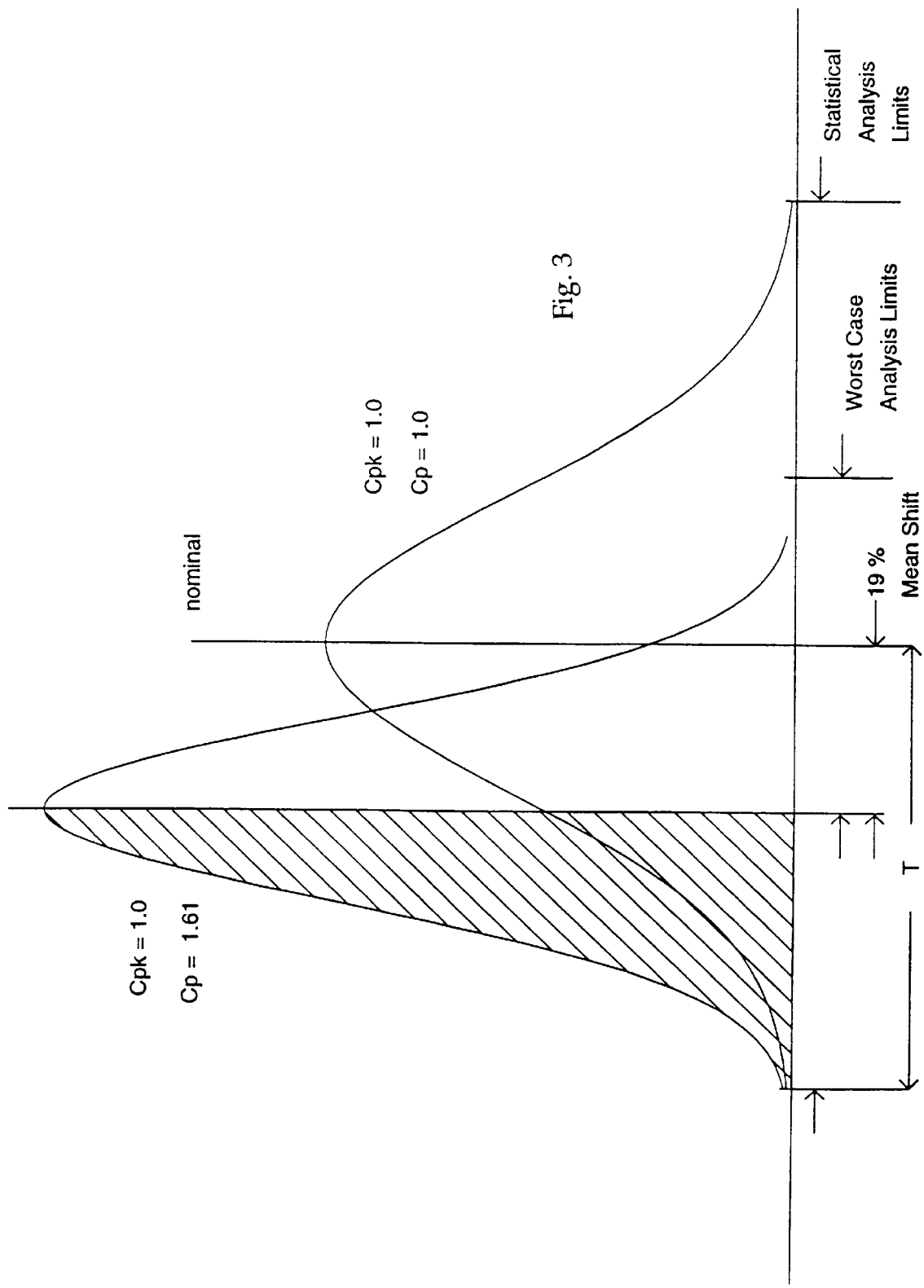
FIG. 3 is a graph of two distributions of process values having a Cpk=1.0 and showing the relationship of tolerance limits set by conventional, worst case tolerance analysis.

The unmodified prior art RSS method assumes that the process is centered on the nominal and that Cp=1.0. However since it is difficult to achieve, the process means are not always centered as shown in FIG. 2. FIG. 3 illustrates two possible detail part distributions having a Cpk=1.0. The specification limits were established using a traditional RSS analysis method for a seven part tolerance chain of equal tolerances. It can be seen that a distribution having a Cp=1.61 with a Cpk=1.0 could have half of its parts exceed the worst case analysis limits shown because of a large mean shift. Distributions having larger Cp's could result in even more parts exceeding the arithmetic worst case limits. Such mean shifts increase the assembly non-conformance risks since they shift the normal curve toward one end of the assembly design requirement. To effectively account for some amount of mean shift one can employ an inflation factor, namely $$T_{assy}^{\Delta} = M(n)T_{assy}^{*} = M(n)\sqrt{a_1^2 t_1^2 + a_2^2 t_2^2 + \ldots + a_n^2 t_n^2}$$

Here the superscript $\Delta$ indicates "mean shift inflation." Such modification factors $M(n)$, with $M(n)>1$, have been suggested in the past as a means of adjusting for centered but nonnormal distributions. Since such factors lead to tighter part tolerances, it has been suggested this will also have compensatory effects in dealing with mean shifts. However, this vague reasoning is not specific to mean shifts and in particular not to the amount of mean shift permitted. If detail part process capability and distribution mean shift data is known, a more accurate detail part tolerance requirement can be determined.

The modification factor $M(n)$ will be derived below. The modified RSS approach is applicable for use in the analysis of assemblies made with the determinant assembly process.

The assumptions used for the assembly analysis are:

1. All tolerance contributors are modeled as normal distributions including;
   hole location
   material thickness
   fastener/hole clearances
   flange angularity
2. All tolerance contributors which relate to detail part datums will require that detail part mean shift be controlled within a preselected percentage of the total tolerance band.
3. Detail part tolerances will be based on the selection of preferred fabrication processes of known capabilities using standard SPC capability indices.
4. Tool tolerances are treated as worst case.

Although measurements of part features will not all follow a normal distribution perfectly, virtually all will be close enough for purposes of this discussion.

As discussed above, the RSS method usually assumes a process centered on nominal. However, detail part features will shift from the nominal value a small amount. It should be noted that drawing nominal dimensions should be shown at the center of the tolerance band for statistically toleranced features. The range of such shifts can be assumed to be proportional to the inherent part process variation. The current state of knowledge about process capability and the ability to center the process on nominal is incomplete and requires that assumptions be made from the fabrication capability data available. Based on current process capability knowledge, controlling mean shifts for position accuracy of coordination holes for determinant assembly within 10% of the specified tolerance band is considered to be an achievable goal and will be the preselected mean shift value for establishing predictions of assembly nonconformance made with said coordination holes. Other values for mean shift control could be selected based on known or expected fabrication capability.

The derivation of a modification factor $M(n)$ can be motivated in two different ways, still using some form of RSS type of tolerance stacking. The first approach treats the mean shifts by arithmetic or worst case stacking of mean shifts, subject to a selected 10% limitation described above, and combining that with an RSS stacking of the allowed remaining variability. The second approach treats the mean shifts themselves as random and takes advantage of that by RSS stacking of mean shifts within a 10% limitation, and combining that arithmetically with an RSS stacking of the remaining variability.

In the first approach, the assembly mean shift is bounded in worst case fashion in terms of the part feature mean shifts. Denoting the mean and nominal of the $i^{th}$ part feature by $\mu_i$ and $\nu_i$, respectively, and by $\Delta_i = \mu_i - \nu_i$ the corresponding mean shift, the assembly mean shift is bounded by:

$$|\mu_{assy} - \nu_{assy}| =$$
$$|a_1 \Delta_1 + \ldots + a_n \Delta_n| \leq |a_1||\Delta_1| + \ldots + |a_n||\Delta_n| = \eta_1 |a_1| t_1 + \ldots + \eta_n |a_n| t_n$$

Here $\eta_i = |\Delta_i|/t_i$ expresses the amount of mean shift as a proportion of the part tolerance $t_i$. The above requirement amounts to $\eta_i \leq 0.20$ for all parts, since $|\Delta_i|/(2t_i) \leq 0.10$ as required by 10% limitation. Given the absolute mean shift $|\Delta_i|$ and Cpk$\geq$1.0, it follows that the part feature standard deviation can be at most $$\sigma_i \le \frac{t_i - |\Delta_i|}{3} = \frac{t_i - \eta_i t_i}{3} = \frac{t_i(1 - \eta_i)}{3}$$

so the standard deviation of the assembly can be at most $$\sigma_{assy} = \sqrt{a_1^2 \sigma_1^2 + \ldots + a_n^2 \sigma_n^2} \le \sqrt{[a_1 t_1(1-\eta_1)/3]^2 + \ldots + [a_n t_n(1-\eta_n)/3]^2}.$$

Combining this upper bound on the RSS variability stack with the worst case mean shift stack $\eta_1 |a_1| t_1 + \ldots + \eta_n |a_n| t_n$ in arithmetic or worst case fashion one obtains:

$$T_{1,assy} = 2782\sigma_{assy} + \eta_1 |a_1| t_1 + \ldots + \eta_n |a_n| t_n \le$$
$$.927\sqrt{[a_1 t_1(1-\eta_1)]^2 \ldots + [a_n t_n(1-\eta_n)]^2} + \eta_1 |a_1| t_1 + \ldots + \eta_n |a_n| t_n,$$

Here the RSS variability stack is taken to be $2.782\sigma_{assy}$ rather than $3\sigma_{assy}$, since only one tail of the normal distribution will contribute to the risk of non-conformance with the $\pm T_{1,assy}$ assembly tolerance. In traditional, centered RSS analysis this risk is set at 0.0027. The probability for a standard normal deviate to exceed 2.782 is 0.0027.

Subject to $\eta_i \le \eta_0 = 0.20$, this bound on $T_{1,assy}$ becomes largest when $\eta_1 = \ldots = \eta_n = \eta_0$. Taking this upper bound as $T_{1,assy}$ results in the maximal (conservative) assembly tolerance $$T_{1,assy} = \eta_0(|a_1| t_1 + \ldots + |a_n| t_n) + .927(1-\eta_0)\sqrt{a_1^2 t_1^2 + \ldots + a_n^2 t_n^2}$$

This assembly tolerance can further be bounded by the worst case situation of equal tolerance contributions $|a_1| t_1 = \ldots = |a_n| t_n$, namely $$T_{1,assy} = T^*_{assy}\left(.927(1-\eta_0) + \eta_0 \frac{|a_1| t_1 + \ldots + |a_n| t_n}{T^*_{assy}}\right) \le$$
$$T^*_{assy}\left(.927(1-\eta_0) + \eta_0 \sqrt{n}\right) = M_1(n) T^*_{assy}$$

with $$.927(1-\eta_0) + \eta_0 \frac{|a_1| t_1 + \ldots + |a_n| t_n}{T^*_{assy}} \le .927(1-\eta_0) + \eta_0 \sqrt{n} = M_1(n).$$

The second approach to mean shift stacking assumes that the various mean shifts occur randomly and thus offer themselves to RSS stacking with some resultant variation cancellation. If the mean shift randomness is of a one time nature, i.e. occurs only once for each part feature process, then the part feature mean shifts $\Delta_i = \mu_i - v_i$ can be viewed as random selections from the intervals $[-\eta_0 t_i, \eta_0 t_i]$. They can also be represented as $$\Delta_i = \eta_0 t_i Y_i$$

where the $Y_i$ have a uniform distribution over the interval $[-1,1]$. Once these random shifts have been realized they limit, through the $Cpk \ge 1.0$ requirement, the part feature variability, namely $$\sigma_i(Y_i) \le \frac{t_i - |\Delta_i|}{3} = \frac{t_i(1 - |Y_i|\eta_0)}{3}$$

The assembly deviation from nominal can be written as $$X_{assy} - v_{assy} = a_1(X_1 - v_1) + \ldots + a_n(X_n - v_n)$$
$$= a_1(X_1 - \mu_1) + \ldots + a_n(X_n - \mu_n) + a_1(\mu_1 - v_1) + \ldots + a_n(\mu_n - v_n)$$

Given fixed values of $Y = (Y_1, \ldots, Y_n)$ determining the respective part feature mean shifts, one can view the assembly deviation $X_{assy} - v_{assy}$ as having an approximate normal distribution with mean $$\mu_{assy}(Y) = a_1(\mu_1 - v_1) + \ldots + a_n(\mu_n - v_n)$$
$$= a_1 \eta_0 t_1 Y_1 + \ldots + a_n \eta_0 t_n Y_n$$

and variance $$\sigma^2_{assy}(Y) =$$
$$a_1^2 \sigma_1^2(Y_1) + \ldots + a_n^2 \sigma_n^2(Y_n) \le a_1^2 \frac{t_1^2(1-|Y_1|\eta_0)^2}{3^2} + \ldots + a_n^2 \frac{t_n^2(1-|Y_n|\eta_0)^2}{3^2}$$

Note that both mean and variance of $X_{assy} - v_{assy}$ depend, through Y, crucially on the mean shift realizations. For fixed Y, one can expect that 99.73% of all values of $X_{assy} - v_{assy}$ fall within $$\mu_{assy}(Y) \pm 3\sigma_{assy}(Y)$$

This interval will move around as the values of Y change. These values of Y, governing the mean shifts, are realized just once for each set of part processes feeding into a particular type of assembly. It is possible to contain the above interval within a larger interval [A,B] for almost all realizations of Y, i.e., with high probability, here taken to be 0.9973, one has $$P([\mu_{assy}(Y) - 3\sigma_{assy}(Y), \mu_{assy}(Y) + 3\sigma_{assy}(Y)] \text{ contained in } [A,B]) = 0.9973.$$

Actual values for A and B can be computed as shown below. This is in contrast with actual values for $[\mu_{assy}(Y) - 3\sigma_{assy}(Y), \mu_{assy}(Y) + 3\sigma_{assy}(Y)]$ which are not known, since the actual realized mean shifts and thus the Y, are not known a priori at the design stage. It is this interval [A,B] that will be used as the assembly tolerance interval within which at least 99.73% of all assembly deviations $X_{assy} - v_{assy}$ are expected to fall.

After all the part process mean shifts have been realized, it is of interest to consider what proportion of the resulting assemblies will fall outside [A,B]. The interval $$I(Y) = [\mu_{assy}(Y) - 3\sigma_{assy}(Y), \mu_{assy}(Y) + 3\sigma_{assy}(Y)]$$

captures 99.73% of the normal density positioned over its center. As this interval with its normal density slides back and forth within [A,B], the area under the density outside of [A,B] is largest when the interval I(Y) abuts either A or B, in which case only one side of this density will significantly contribute to the probability of falling outside of [A,B]. This probability is thus only half, namely $\approx 0.00135$, of the originally intended 0.0027. To correct for this, one takes instead $$I(Y) = [\mu_{assy}(Y) - 2.782\sigma_{assy}(Y), \mu_{assy}(Y) + 2.782\sigma_{assy}(Y)]$$

i.e., take the factor 2.782 instead of the factor 3 in defining I(Y), since $P(Z>2.782)=1-\Phi((2.782)=0.0027)$. This then results in at most 0.27% of assemblies falling outside the tolerance interval [A,B]. The qualifier "at most" results from the ignorance of where within [A,B] the interval I(Y) is positioned.

It remains to find the larger bracketing interval [A,B]. It will allow for the chance variations in Y while trying to bracket I(Y). The interval I(Y) can either bound out of [A,B] at the high end, i.e., $\mu_{assy}(Y)+2.782\sigma_{assy}(Y)>B$ or at the low end, i.e., $\mu_{assy}(Y)-2.782\sigma_{assy}(Y)<A$. By taking either of those risks to be 0.00135, the chance that one interval endpoint of I(Y) falls outside of [A,B] is 0.00135+0.00135=0.0027. Thus the probability of containment will be its complement, namely the desired 0.9973.

Instead of bounding $\mu_{assy}(Y)+2.782\sigma_{assy}(Y)$ from above by B with probability 0.99865=1−0.00135, it is more useful to bound that interval endpoint divided by $$T^*_{assy} = \sqrt{a_1^2 t_1^2 + \ldots + a_n^2 t_n^2},$$

i.e., $$\frac{\mu_{assy}(Y) + 2.782\sigma_{assy}(Y)}{T^*_{assy}} \leq \eta_0[w_1 Y_1 + \ldots + w_n Y_n] +$$

$$\frac{2.782}{3}\sqrt{w_1^2(1-|Y_1|\eta_0)^2 + \ldots + w_n^2(1-|Y_n|\eta_0)^2} = B(Y)$$

with $w_i = a_i t_i / T^*_{assy}$. The randomness of Y entails that this upper bound B(Y) has an approximate normal distribution. This approximation is quite good for $n \geq 5$ and for $2 \leq n \leq 4$ it leads to conservative assembly tolerance bounds. Furthermore, it turns out that the case of equal tolerance contributions, i.e., $|a_1|t_1 = \ldots = |a_n|t_n$ or $W_1 = \ldots = w_n = 1/\sqrt{n}$, yields the most conservative assembly tolerance bounds. Assuming this latter case, the above mentioned normal distribution for the upper bound B(Y) has mean $$\mu_F = \frac{2.782}{3}\sqrt{1-\eta_0 + \eta_0^2/3} = .927\sqrt{1-\eta_0 + \eta_0^2/2} = .83632 \text{ for } \eta_0 = .2$$

and standard deviation $$\sigma_F = \frac{\eta_0}{\sqrt{3}} = .1155 \text{ for } \eta_0 = .2$$

Thus $$P(B(Y) \leq \mu_F + 3\sigma_F) = \Phi(3) = 0.99865.$$

Taking $B_F = \mu_F + 3\sigma_F (B_F = 1.183 \text{ for } \eta_0 = 0.2)$ and $B = B_F T^*_{assy}$ one has $$\mu_{assy}(Y) + 2.782\sigma_{assy}(Y) \leq B = B_F T^*_{assy},$$

for 99.865% of all Y or mean shift contingencies. Hence $$\mu_{assy}(Y) + 2.782\sigma_{assy}(Y) > B \ (B = 1.183 T^*_{assy} \text{ when } \eta_0 = 0.2)$$

with probability 0.00135.
Similarly, $$\frac{\mu_{assy}(Y) - 2.782\sigma_{assy}(Y)}{T^*_{assy}} \geq \eta_0[w_1 Y_1 + \ldots + w_n Y_n] -$$

-continued $$\frac{2.782}{3}\sqrt{w_1^2(1-|Y_1|\eta_0)^2 + \ldots + w_n^2(1-|Y_n|\eta_0)^2} = A(Y)$$

where A(Y) is approximately normal with mean $-\mu_F$ and standard deviation $\sigma_F$. This leads to $$P(A(Y) \geq -\mu_F - 3\sigma_F) = 1 - \Phi(-3) = \Phi(3) = 0.99865.$$

Taking $A_F = -B_F$ and $A = A_F T^*_{assy} = -B$ one has $$\mu_{assy}(Y) - 2.782\sigma_{assy}(Y) \geq A = A_F T^*_{assy},$$

for 99.865% for all Y or mean shift contingencies. Hence $$\mu_{assy}(Y) - 2.782\sigma_{assy}(Y) < A \ (A = -1.183 T^*_{assy} \text{ when } \eta_0 = 0.2)$$

with probability 0.00135. Thus I(Y) bounds outside of [A,B] with probability 0.00135±0.00135=0.0027 and is contained in [A,B] for the complementary 99.73% of all mean shift contingencies.

Since −A=B, the bracketing interval [A, B] is centered on zero. To emphasize the tolerance context and the different nature from the arithmetic stacking of mean shifts in $T_{1,assy}$, this common value of B and −A is also denoted by $T_{2,assy}$.

Thus the assembly tolerance, after allowing for the one-time mean shift variation through statistical stacking and allowing for the remaining and recurring part feature variation also through statistical stacking, is bounded by $$|X_{assy} - v_{assy}| \leq T_{2,assy} = M_2(n) T^*_{assy}$$

with $$M_2(n) = B_F = .927\sqrt{1 - \eta_0 + \eta_0^2/3} + \eta_0 \sqrt{3} \ (= 1.183 \text{ for } \eta_0 = .2).$$

Note that $M_2(n)$, in contrast to $M_1(n)$, does not depend on n. This is due to the statistical stacking of mean shifts.

Until such time that actual process data is available to validate the statistical properties of the hole location mean shifts, it is considered reasonable to assume that the actual factor is somewhere in between the two approaches.

As a compromise of the two approaches one can take as modification factor the average of $M_1(n)$ and $M_2(n)$:

$$M(n) = \frac{M_1(n) + M_2(n)}{2} = \frac{(.927)(.8) + .2\sqrt{n} + 1.183}{2} = \frac{1.925 + .2\sqrt{n}}{2}$$

The table below gives the values of $M_1(n)$, $M_2(n)$, and the average factor M(n) for various values of n.

| | RSS Modification Factor | | | | | | |
|---|---|---|---|---|---|---|---|
| n | 2 | 3 | 4 | 5 | 6 | 7 | 8 |
| $M_1(n)$ | 1.024 | 1.088 | 1.142 | 1.189 | 1.231 | 1.271 | 1.307 |
| $M_2(n)$ | 1.183 | 1.183 | 1.183 | 1.183 | 1.183 | 1.183 | 1.183 |
| M(n) | 1.104 | 1.136 | 1.162 | 1.186 | 1.207 | 1.227 | 1.245 |

During the part tolerance analysis development, it was found that the number of significant tolerances in a typical aircraft fuselage stackup is approximately eight. An RSS modifier of M(n)=1.25 will work for most analysis as a simplified and conservative approach for tolerance stackups of up to eight significant contributors. However, the use of factors from the above table or formula is acceptable if required to validate the assembly sequence/manufacturing plan.

It can be seen from the above discussion that a preselected mean shift value other than 10% could be used to develop a different RSS modification factor which is within the scope of this invention. In most applications, a 20% preselected mean shift value would be considered a practical limit as greater mean shifts will tend to approach worst case tolerance limits eliminating the benefit of wider detail tolerances derived with statistical tolerancing.

Since preferred detail part fabrication processes may be found which exceed the preselected mean shift limit, it is desirable to provide a process for part acceptance which will not increase assembly risk for assemblies as toleranced to the initial mean shift limit.

Increased mean shifts adversely affect the worst case aspect of tolerance stacking. It can be shown that, up to a point, reduced part variability (increased Cpk) may act as an acceptable trade-off for increases in detail part mean shifts above the preselected value of 10%. Once assembly specification limits have been established, the initial mean shift limit has been selected, and the detail tolerances have been allocated by the above procedure, there is available a method for trading off Cpk's and increased mean shifts. In order for such trade-offs to be possible independently from detail part to detail part or from vendor to vendor, this procedure assumes the worst case scenario, namely that all detail part mean shifts could have increased to the same percentage (higher than 10%) and have been compensated by an appropriate increase to a common Cpk>1.0. This trade-off relationship is developed below.

Denote by $\eta^*$ the new maximal mean shift fraction as observed for the $i^{th}$ detail part process, i.e., $|\mu_i - v_i| \leq \eta^* t_i = (\eta^*/2) 2t_i$. Correspondingly denote by Cpk*, the Cpk value which is required to compensate for the new maximal mean shift in the $i^{th}$ detail part process. In the original development of the tolerancing method it was assumed at Cpk>1.0 for all detail part processes. Now it is hoped that a value of $Cpk_i$ much larger than one will sufficiently offset an increase of $\eta^*$ over the preferred value $\eta_0 = 0.2$ (or 10% mean shift). Following closely the development of the original M(n) factors and maintaining the same notation note that $$Cpk_i = \frac{t_i(1-\eta_i)}{3\sigma_i} \geq Cpk^* \Rightarrow \sigma_i \leq \frac{t_i(1-\eta_i)}{3Cpk^*}$$

so that a larger value of Cpk* means less variability, i.e., a smaller $\sigma_i$. From this obtain an assembly $\sigma$:

$$\sigma_{assy} = \sqrt{a_1^2 \sigma_1^2 + \ldots + a_n^2 \sigma_n^2} \leq$$
$$\sqrt{[a_1 t_1(1-\eta_1)/(3Cpk^*)]^2 + \ldots + [a_n t_n(1-\eta_n)/(3Cpk^*)]^2}$$

Stacking $2.782\sigma_{assy}$ in worst case fashion with the worst case stack of mean shifts $\eta_1|a_1|t_1 + \ldots + \eta_n|a_n|t_n$ results in $$T^*_{1,assy} = 2.782\sigma_{assy} + \eta_1|a_1|t_1 + \ldots + \eta_n|a_n|t_n =$$
$$.927\sqrt{[a_1 t_1(1-\eta_1)]^2 + \ldots + [a_n t_n(1-\eta_n)]^2} + \eta_1|a_1|t_1 + \ldots + \eta_n|a_n|t_n$$

which, subject to $\eta_i \leq \eta^*$, becomes largest when $\eta_1 = \ldots = \eta_n = \eta^*$. As before, this is then reduced to $$T^*_{1,assy} \leq M_1 * (n) T^*_{assy}$$

-continued with $$M^*_1(n) = \frac{.927(1-\eta^*)}{Cpk^*} + \eta^* \sqrt{n} \text{ and } T^*_{assy} = \sqrt{a_1^2 t_1^2 + \ldots + a_n^2 t_n^2},$$

assuming the worst case of equal tolerance contributors, i.e. $|a_1|t_1 = \ldots = |a_n|t_n$.

The other approach to dealing with mean shifts took advantage of statistical tolerancing for the mean shifts as well, i.e., treat the mean shift $\Delta_i$ as random, $\Delta_i = \eta^* t_i Y_i$, where the random variable $Y_i$ is assumed to be uniformly distributed over the interval $[-1,1]$. Following the previous development, but incorporating the more stringent Cpk requirement, one arrives at $$T^*_{2,assy} = M^*_2(n) T^*_{assy}$$

with $$M^*_2(n) = \frac{.927}{Cpk^*} \sqrt{1 - \eta^* + \eta^{*2}/3} + \sqrt{3}\eta^*.$$

Corresponding to the previous compromise between these two approaches one takes the average of these two inflation factors $$M*(n) = \frac{M^*_1(n) + M^*_2(n)}{2}$$
$$= \frac{.927}{Cpk^*}\left[1 - \frac{\eta^* + \sqrt{1-\eta^* + \eta^{*2}/3}}{2}\right] + \eta^* \frac{\sqrt{n} + \sqrt{3}}{2}.$$

In order for the assembly risk to stay at the same level obtained when using $M(n)T^*_{assy}$ as assembly tolerance stack one should match $$M(n)T^*_{assy} = M^*(n)T^*_{assy} \text{ or } M(n) = M^*(n) \text{ or for } \eta_0 = .2$$

$$.9271 - \eta_0 + \frac{\sqrt{1-\eta_0+\eta_0^2/3}}{2} + \eta_0\sqrt{n} + \frac{\sqrt{3}}{2} =$$

$$.962 + .1\sqrt{n} = \frac{.927}{Cpk^*}\left[1 - \frac{\eta^* + \sqrt{1-\eta^*+\eta^{*2}/3}}{2}\right] + \eta^* \frac{\sqrt{n}+\sqrt{3}}{2}$$

which leads to the following trade-off relationship between Cpk* and $\eta^*$:

$$Cpk^* = \frac{.927\left(1 - \eta^* + \sqrt{1-\eta^*+\eta^{*2}/3}\right)}{1.924 + .2\sqrt{n} - \eta^*(\sqrt{n}+\sqrt{3})}.$$

Figure 4:
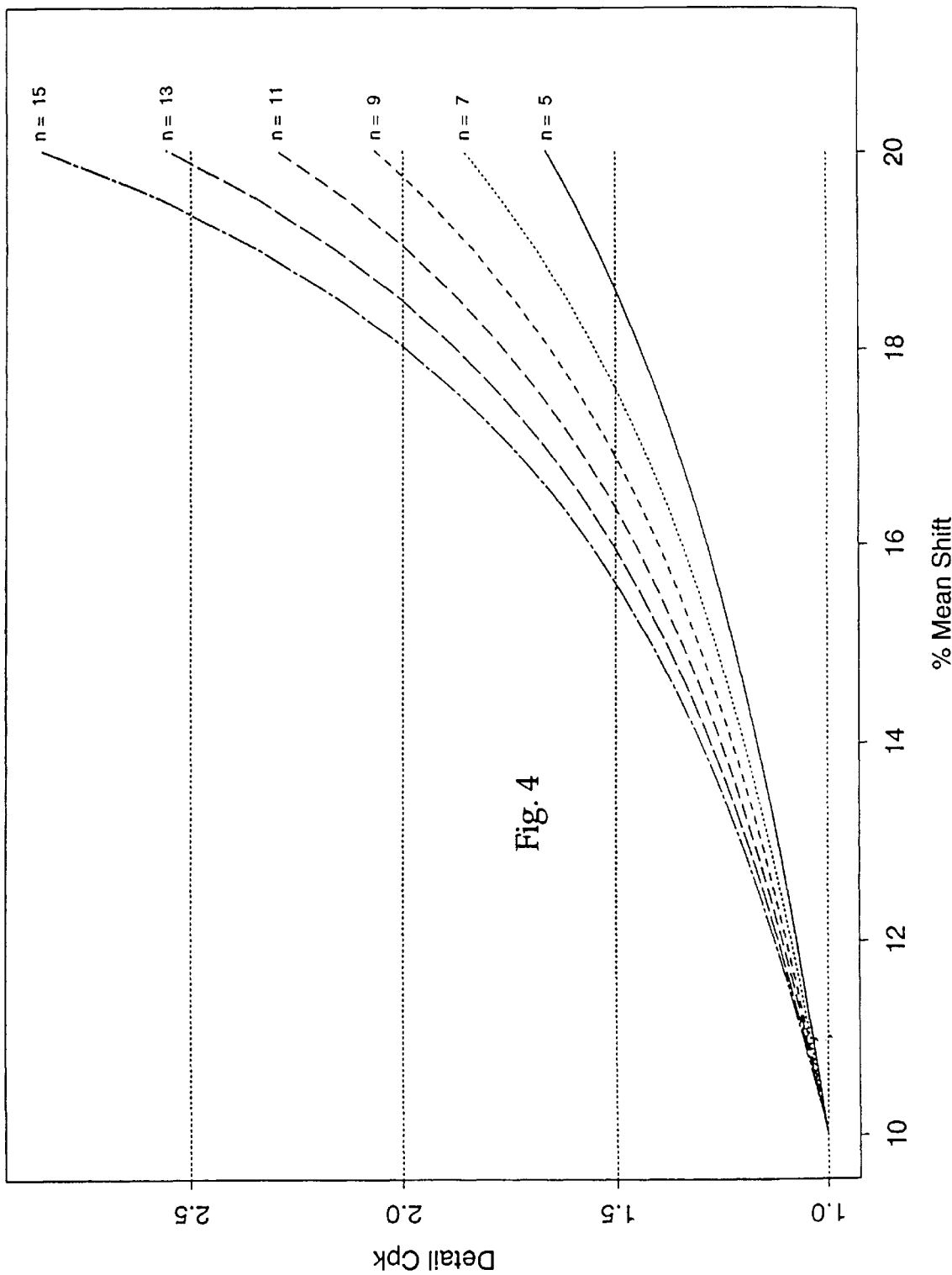
FIG. 4 is a graph showing the allowed trade-off of mean shift for increased Cpk for production detail parts.

FIG. 4 illustrates the trade-off relationship for various numbers n of detail parts in the assembly. For general initial values of $\eta_0$, the trade-off relationship is $$Cpk^* = \frac{.927\left(1-\eta^* + \sqrt{1-\eta^*+\eta^{*2}/3}\right)}{.927\left(1-\eta_0 + \sqrt{1-\eta_0+\eta_0^2/3}\right) + (\eta_0 - \eta^*)(\sqrt{n}+\sqrt{3})}$$

Figure 5:
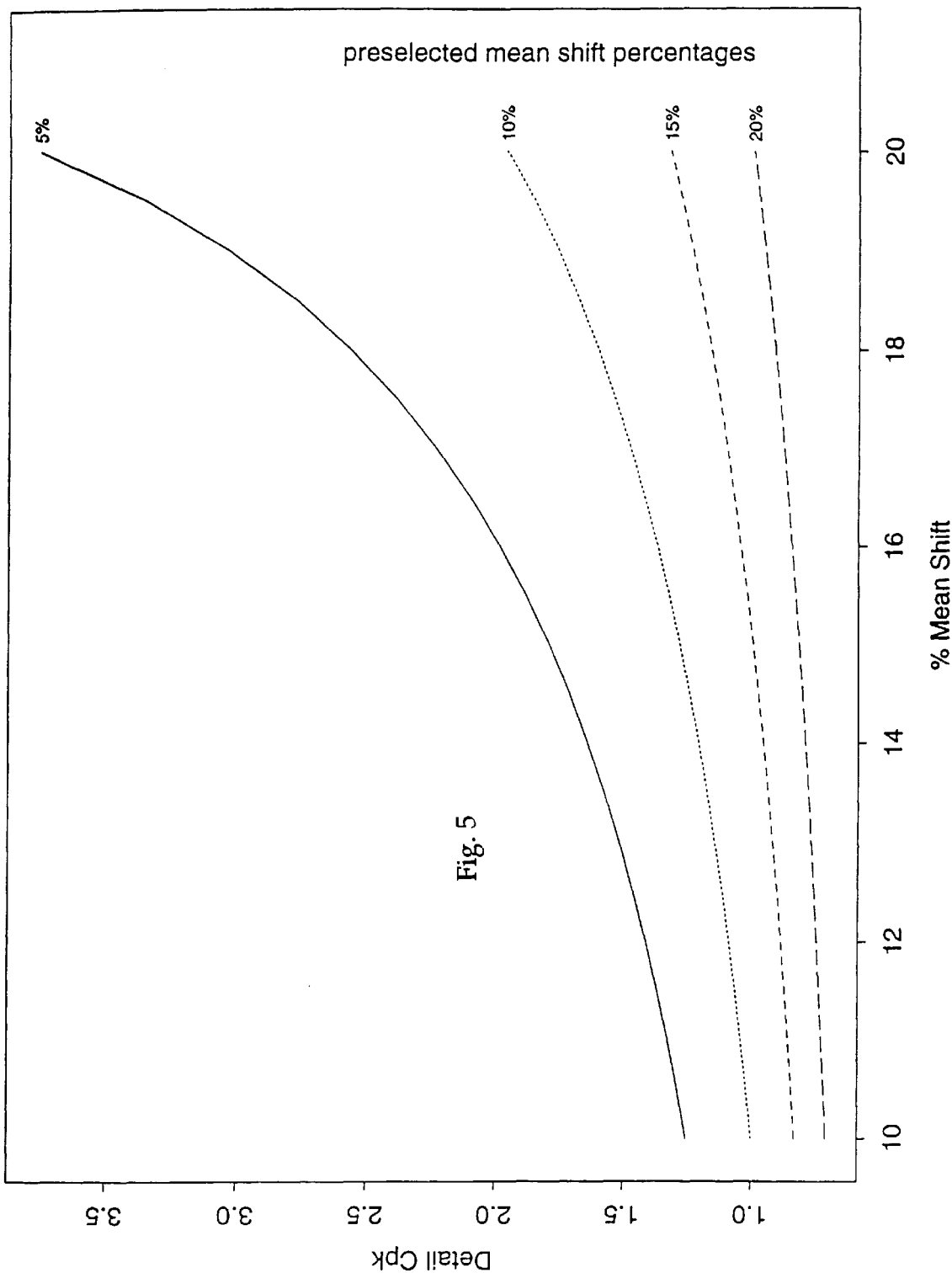
FIG. 5 is a graph showing the trade-off between additional mean shift and increased Cpk for a family of curves illustrating various preselected mean shifts.

FIG. 5 illustrates this latter trade-off relationship for an assembly of n=8 parts for various preselected mean shift values $\eta_0$.

Figure 6:
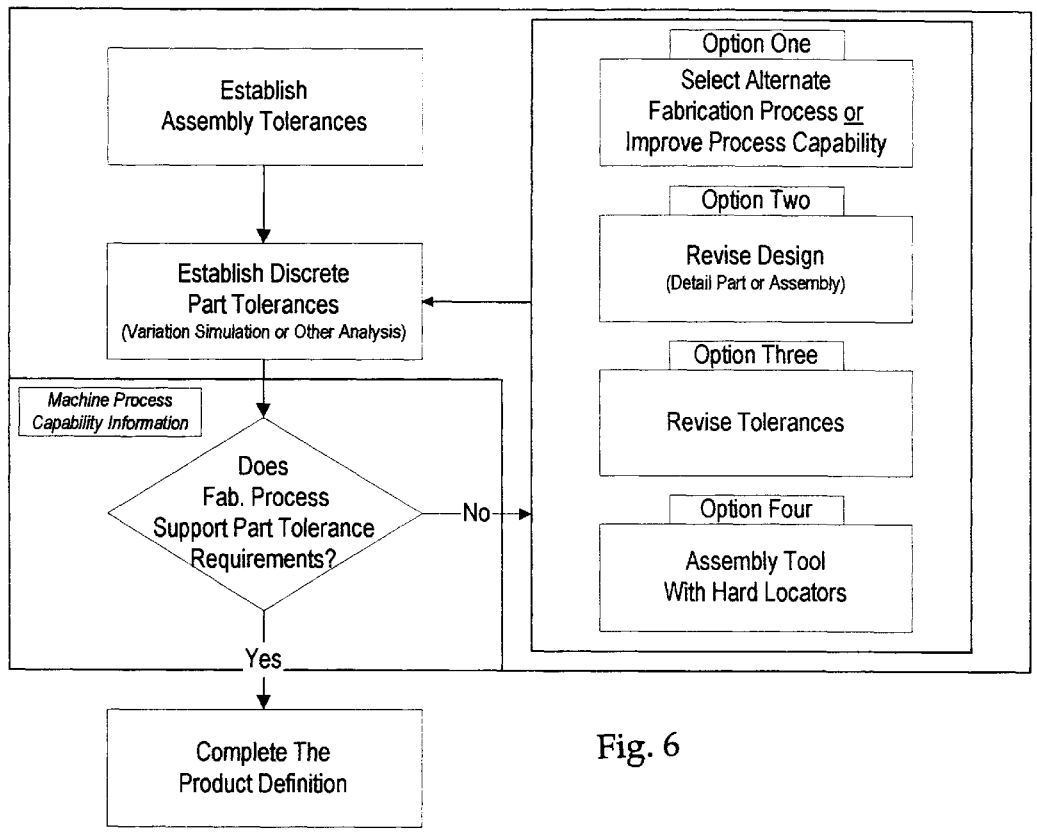
FIG. 6 is a diagram of a tolerance evaluation process in accordance with this invention.

Establishing valid end item tolerances required to meet functional assembly requirements is the first step in a tolerance evaluation process in accordance with this invention as illustrated in FIG. 6. When a traditional design approach showing installations on stable mylar drawings has been employed, most features on commercial transport airplanes were then defined within ±0.03 of each other, and tooling was built to satisfy these requirements. This method of assigning tolerances has been adequate in the past for manufacture of flexible structures like airplanes by using rigid tooling to locate the parts relative to each other and establish the configuration of the assemblies. However, using determinant assembly as the manufacturing technique, tooling is greatly simplified or eliminated. Therefore, it is necessary to establish tolerances at assembly interfaces before detail part allocation can be evaluated since tools are no longer used to locate each detail part.

Using the new techniques of determinant assembly, the structure is assembled, without tools, by positioning detail parts, flexing where necessary within the preload limits for the parts in question, until the desired relationship between the coordination features is achieved, for example, alignment of coordination holes in the two detail parts. Therefore in order to determine an acceptable assembly tolerance, part flexibility and residual stresses due to pull-down must be considered in the analysis. In some highly loaded or fatigue prone details, little or no pull-down may be allowed. Therefore, the required tolerance for acceptable assembly must account for but not be limited to the following factors:

Desired Relation Between Coordination Features
Geometric Fit Criteria As Established By Performance Or Appearance Requirements
Minimum/Maximum Clearance
Pull-Down/Shimming Requirements Specific detail part processes must be determined to accurately predict assembly variation. The single most reliable and economical process for manufacturing a part family will define the preferred processes for part fabrication. The selected process must be "capable". Fabrication capability includes a quantitative understanding of the effects that process variables have on finished parts. Process variables include room and machine temperature, machine stiffness and periodic maintenance, material variation, feed and cutter speeds, cutting fluid condition, cutter sharpness, etc.

Detail part datum selection is required prior to performing a determinant assembly tolerance analysis. Proper selection requires knowledge of both the assembly end item requirements and the manufacturing plan for fabricating the detail parts. The assembly analysis requires that the actual part features used in fabrication be identified prior to allocating the assembly tolerance budget to each of the detail parts. Based on this analysis, both design and tooling must be in agreement with the selected datums in order to accurately represent detail part variation.

A modified RSS analysis evaluates variation separately for each axis in an X, Y, Z coordinate system. To establish an assembly tolerance path, it is necessary to clearly show the reference X, Y, Z coordinate system used for the analysis. A tolerance value has no meaning without a reference system.

Figure 7:
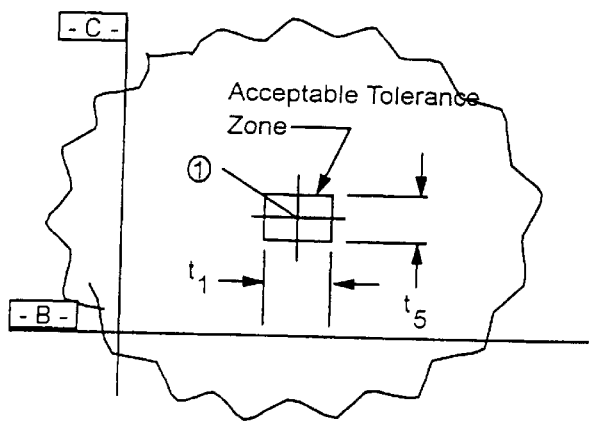

A coordination hole often must satisfy different tolerance requirements in two directions even though each requirement is analyzed independently. After the most restrictive statistical tolerance is determined, the drawing tolerance requirement is interpreted as shown in FIGS. 7 and 8.

This method is different from the typical rule of thumb used in geometric dimensioning and tolerancing (GD&T) where the total coordinate tolerance zone is multiplied by a 1.4 factor to convert a square tolerance zone to a circular true position tolerance zone. The GD&T conversion is intended to allow additional fabrication tolerance for hole location when fastener interchangeability is the design driver. The design driver for the determinant assembly approach is typically not fastener interchangeability but part position which is controlled through hole to hole pinning. For example, $$t_x = \pm 0.010$$

$$t_y = \pm 0.007$$

If the tolerances were treated as a rectangular tolerance zone, a total true position tolerance zone diameter of 0.0244 would result. A typical GD&T interpretation as shown in FIG. 9 results in an incorrect drawing interpretation. If the drawing callout is shown as $\phi 0.0244$, all of the cross hatched area would be considered acceptable per the detail drawing requirements. However, every part that fell in the cross hatched area would be outside the calculated statistical tolerance analysis range and would increase the number of out of tolerance assemblies. In some cases, fabrication capability may be better in one axis than another. If the tolerance analysis results allow, a rectangular tolerance zone may be shown on the drawing and eliminates the possible misinterpretation resulting from use of standard GD&T nomenclature.

Since assembly tolerances in determinant assembly can be strongly influenced by the fastener, it is necessary to know the planned assembly fastener type. It is also necessary to understand something about how the fastener fills the coordination hole in order to specify how much clearance to include in the tolerance path.

Cleco and Wedgelock type temporary fasteners provide very little self centering of coordination holes. In addition, any radial alignment would only occur in the direction normal to the "bow" of the fastener.

Blind rivets with pull-through mandrels will be used as temporary fasteners in many determinant assembly applications. The open hole in the center of the fastener is used for optical alignment to drill out the temporary fastener when the final fastener is installed.

When a blind rivet is installed, the mandrel expands the shank of the fastener. With light or flexible parts and when expansion of the shank aligns the holes no clearance need be accounted for in the tolerance analysis. As part weight or stiffness increases, the self-centering affect of small blind rivets will be overcome and self-centering will not occur. This is shown in FIGS. 10A and 10B.

The particular hole filling ability of the fastener must be considered in establishing the hole clearance to be added in tolerance path. For example if a selected fastener expands to $\phi 0.136$ minimum during installation into a $\phi 0.1406$–$0.1436$ hole, then a reasonable assembly tolerance analysis will consider $$H_{average} = \frac{.1406 + .1436}{2}$$

$$= .1421$$

$$T_{blind\ rivet} = .1421 - .136$$

$$= \underline{.0061}$$

And this tolerance would be applied to the analysis as:

$$T_{assy} = M(n)\sqrt{t_1^2 + t_2^2 + (.0061)^2 + \ldots}$$

As noted, it is often necessary to rely on temporary fastener expansion to provide required assembly accuracy. This expansion aligns the holes regardless of the hole size. Using the traditional GD&T approach, the drawing tolerance would be shown with a maximum material condition modifier (MMC) on the hole. However, with expanding fasteners this will degrade the assembly accuracy. In addition, use of the MMC modifier complicates statistical data evaluation during part acceptance. Therefore, drawing callout of statistically derived tolerances will be shown with a regardless of feature size (RFS) modifier as shown below.

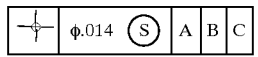

Assemblies of parts using both determinant assembly and tools must account for the tools in the tolerance analysis. To minimize additional tolerances due to the tool, the tool interface should be indexed to a determinant assembly feature on the detail part. Since there are typically a small number of tools, the tool tolerances cannot be modeled with a normal distribution. The tool tolerances must be allocated in the analysis as worst case. This is accomplished by pulling the tool tolerance out of root sum square (RSS) as shown below.

$$T_{assy} = T_{tool,1} + \ldots + T_{tool,k} + M(n)\sqrt{\sum_{i=1}^{n} t_i^2}$$

Figure 11:
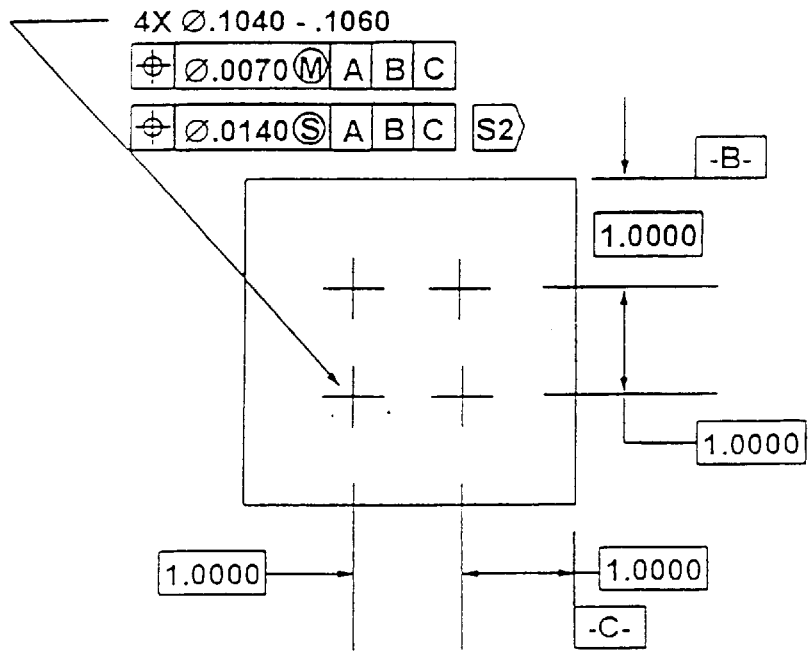
FIGS. 11–13 are examples of drawings and drawing notes used to impose statistical data requirements when statistical tolerances in accordance with this invention are to be used.
Figure 12:
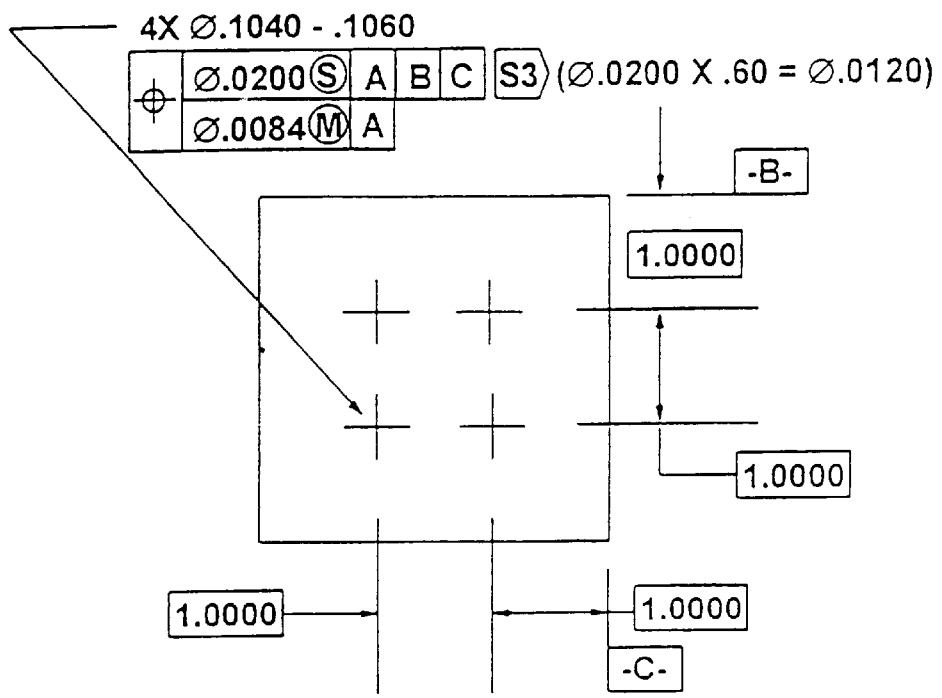
Figure 13:
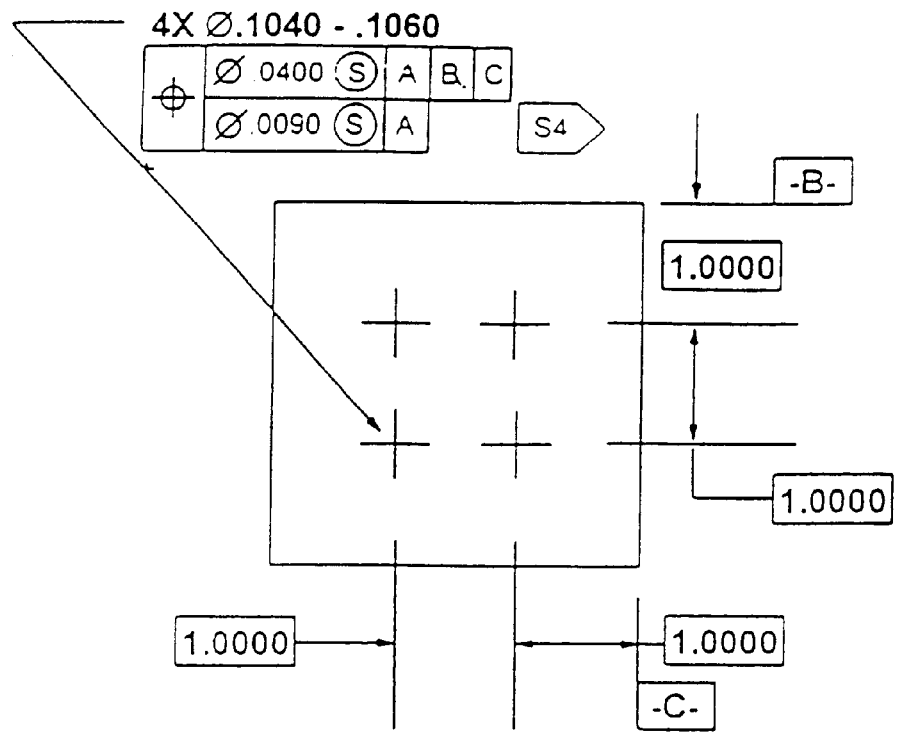

When using the modified RSS analysis approach to evaluate assembly tolerances, some of the tolerance path contributors may be part features which are toleranced without a need for mean shift control but which still benefit from a statistical tolerance treatment. A pattern of holes within a large aircraft skin panel is an example of this type of part. These skin panels control part to part relationships for mating parts but typically will not require control of mean shift to the part datum reference system. Control of the hole position distribution is the primary design goal. It is, therefore, necessary to recognize these tolerance path contributors and to treat them appropriately in the analysis. The analysis approach as presented includes a modification factor, M(n), which is applied to all contributors in the root sum square. Recall that M(n) resulted from a compromise of averaging worst case mean shift stacking and statistical mean shift stacking. For the sake of this exposition it is assumed that the first two tolerance contributors, $t_1$ and $t_2$, are not affected by mean shifts, whereas mean shifts do play a role for the remaining n−2 contributors, $t_3, \ldots, t_n$. Tolerances such as $t_1$ and $t_2$ will be specified on the detail part drawings as shown in FIGS. 11–13.

What is presented below is easily modified for other mean shifts or no mean shift contingencies. Following the previously given derivation of worst case mean shift stacking one arrives at $$T_{1,assy} = \eta_0(|a_3|t_3 + \ldots + |a_n|t_n) + .927(1-\eta_0)\sqrt{a_1^2 t_1^2 + \ldots + a_n^2 t_n^2} \le [.927(1-\eta_0) + \eta_0\sqrt{n-2}]\sqrt{a_1^2 t_1^2 + \ldots + a_n^2 t_n^2} = \tilde{M}_1(n) T^*_{assy}.$$

Taking this upper bound as the final form of $T_{1,assy}$, the effect of the two zero mean shift contributions is the $\sqrt{n-2}$ in $\tilde{M}_1(n) = 0.9271(1-\eta_0) + \eta_0\sqrt{n-2}$ in place of the $\sqrt{n}$ in $M_1(n) = 0.927(1-\eta_0) + \eta_0\sqrt{n}$.

Following a similar rederivation in the case of statistical stacking of mean shifts, one obtains $$T_{2,assy} = \left(.927\sqrt{1 - \tilde{R} + \tilde{R}(1 - \eta_0 + \eta_0^2/3)} + \eta_0\sqrt{3\tilde{R}}\right) \times \sqrt{(1-\eta_0)^2(a_1^2 t_1^2 + a_2^2 t_2^2) + a_3^2 t_3^2 + \ldots + a_n^2 t_n^2}.$$

Here $$\tilde{R} = \tilde{w}_3^2 + \ldots + \tilde{w}_n^2 \text{ with } \tilde{w}_i^2 = \frac{a_i^2 t_i^2}{(1-\eta_0)^2(a_1^2 t_1^2 + a_2^2 t_2^2) + a_3^2 t_3^2 + \ldots + a_n^2 t_n^2}$$

for $i = 3, \ldots, n$.

Here and in the previous derivation it is understood that all tolerances $t_i$, $i=1, 2, \ldots, n$, represent $3\sigma_i$ detail part process variation inflated by the factor $1/(1-\eta_0)$, i.e., $t_i = 3\sigma_i/(1-\eta_0)$.

Since the root sum square terms in these two approaches are not identical, it is not just a matter of averaging the multipliers in order to arrive at a compromise approach. Instead one takes as compromise the average of the two types of assembly tolerances, namely $$T_{assy} = \frac{T_{1,assy} + T_{2,assy}}{2}.$$

This treatment of tolerance contributors without mean shift effect is somewhat involved. The following simpler stacking formula, based mainly on heuristics and the modified RSS method and again presented for the case of k=2 tolerance terms without mean shift effect, may be used as a reasonable approximation (within 10% of $T_{assy}$)

$$\tilde{T}_{assy} = M(n-2)\sqrt{\frac{(t_1^2 + t_2^2)(1-\eta_0)^2}{(M(n-2))^2} + t_3^2 + \ldots}$$

where $$M(n) = \frac{.927(1-\eta_0) + \eta_0\sqrt{n} + .927\sqrt{1-\eta_0 + \eta_0^2/3} + \eta_0\sqrt{3}}{2}$$

The M(n−2) in the denominator under the square root in $\tilde{T}_{assy}$ is to cancel the effect of the inflation factor in front of the square root. The factor $(1-\eta_0)^2$ in that same square root reduces the tolerances $t_1$ and $t_2$, which are assumed to have been inflated a priori by $1/(1-\eta_0)$ to allow for mean shifts.

The assembly tolerance calculated from an RSS analysis results in a prediction that 0.27% of the assemblies will exceed the calculated tolerance limits. There are some cases where the tolerances of the planned assembly cannot be allocated by the RSS method but the plan may still be considered acceptable if the predicted assembly non-conformance is still considered low for the agreed detail part tolerances made with known fabrication capability.

Figure 14:
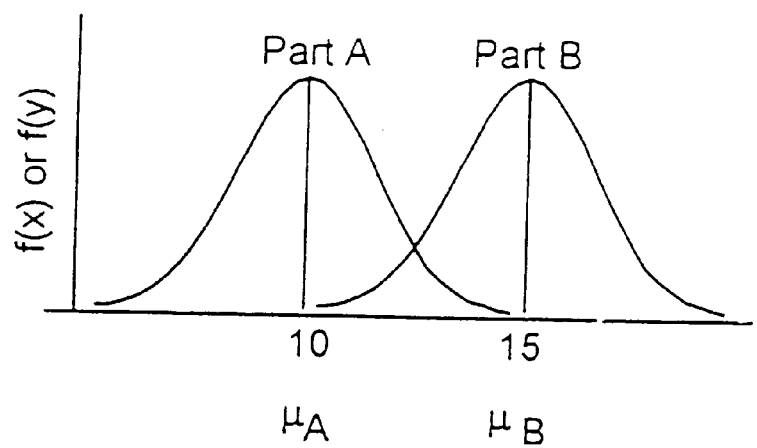
FIG. 14 is a graph showing the overlap of interfering feature distributions.

For parts or assemblies which may interfere, we are interested in the probability of interference. This occurs when the dimension of part A (or assembly) is greater than the dimension of part B (or assembly B). This is shown in FIG. 14.

The probability of A−B>0 (non-interference) is computed as Φ(Z), with Φ the standard normal distribution function defined above and:

$$Z = \frac{\mu_A - \mu_B}{\frac{1}{3}\sqrt{t_A^2 + t_B^2}}.$$

It is often the case that the actual means $\mu_A$ and $\mu_B$ will differ from the nominal drawing values $v_A$ and $v_B$. One can make various assumptions on how such mean shifts come about and how they may be controlled. The simplified method shown below will provide conservative probability predictions of interference for up to 0.27% non-conformance. Namely, compute the non-interference probability as Φ(Z) with $$Z = \frac{v_A - v_B}{\frac{M(n)}{3}\sqrt{t_A^2 + t_B^2}}$$

A more involved treatment will provide an improved prediction accuracy for interference as the non-conformance exceeds 0.27%.

Interchangeability of installing fasteners in mating parts can be 100% assured with the GD&T approach to tolerancing of:

$$T = H - F$$

where:

T=Tolerance
H=MMC Hole
F=MMC Fastener

Statistical predictions of fastener installation can often be analyzed using the modified RSS approach. Multiple part tolerance chains resulting from flexible assemblies can often be simplified for analysis into a linear tolerance path by ignoring the hole position error in the flexible direction. Errors in this direction will not contribute to the problem of fastener installation which is considered to be equally significant in a GD&T tolerance analysis. This problem is encountered often in aircraft structural sub-assemblies which remain flexible in two directions until fasteners are installed during final assembly.

Once valid assembly tolerances are established and economically acceptable detail part process capabilities (with Cpk≧1.0) are determined, an analysis is performed to allocate moieties of the assembly tolerances among the detail parts in the assembly. This analysis considers the assembly effect from allowing the detail part means to shift from the nominal dimensions within the preestablished limits. The following equation is used on an iterative basis to establish discrete part tolerances as shown in FIG. 6.

$$T_{assy,required} \geq T_{assy} = M(n)\sqrt{t_1^2 + t_2^2 + \ldots + t_n^2}$$

where $$M(n).927(1 - \eta_0) + \eta_0\sqrt{n} + .927\sqrt{1 - \eta_0 + \eta_0^2/3} + \frac{\eta_0\sqrt{3}}{2}$$

and $t_i \geq$ process capability limits of the planned detail part process having a Cpk equal to at least 1.0.

If the assembly analysis indicates that 100% of the assemblies will conform to the tolerance requirements with economical arithmetic tolerances applied to the detail parts, a traditional arithmetic drawing tolerance is specified in accord with applicable industry standards such as ANSI-Y14.5. If these detail part tolerances are more restrictive than desired but are still producible, it may be desirable to specify both a traditional detail part tolerance and a statistical tolerance.

Drawing presentations for detail parts which meet assembly requirements with either a traditional arithmetic part tolerance or a more relaxed statistical tolerance will be similar to the drawing sample shown in FIG. 11. A note similar to the following should be applied to the parts list.

Features identified as statistically toleranced shall be produced with statistical process controls, or to the more restrictive arithmetic tolerances shown on the drawing. The statistical tolerance applies only when the process measurements meet the following requirements: 1) The process control charts show that the associated manufacturing process is in control. 2) The mean deviates from nominal no more than ten (0.10) percent of the specified tolerance. 3) The minimum Cpk is 1.0 with 90 percent confidence.

This note will be used only when mean shift control of detail part features is required to the datums of the part.

Drawing presentations for detail parts which meet assembly requirements only if statistical analysis is utilized will be similar to FIG. 12. A note similar to the following should be applied to the parts list.

Features identified as statistically toleranced shall be produced with statistical process controls. The statistical tolerance applies only when the process measurements meet the following requirements: 1) The process control charts show that the associated manufacturing process is in control. 2) The mean deviates from nominal no more than ten (0.10) percent of the specified tolerance. 3) The minimum Cpk is 1.0 with 90 percent confidence.

This note will be used only when mean shift control of detail part features is required to the datums of the part.

Drawing presentation for detail parts which satisfy assembly requirements only if statistical analysis is utilized and which do not require control of mean shift to part datums will be similar the drawing example shown in FIG. 13. A note similar to the following should be applied to the parts list.

Features identified as statistically toleranced shall be produced with statistical process controls. The statistical tolerance applies only when the process measurements meet the following requirements: 1) The process control charts show that the associated manufacturing process is in control. 2) The minimum Cp is 1.0 with 90 percent confidence.

Figure 15:
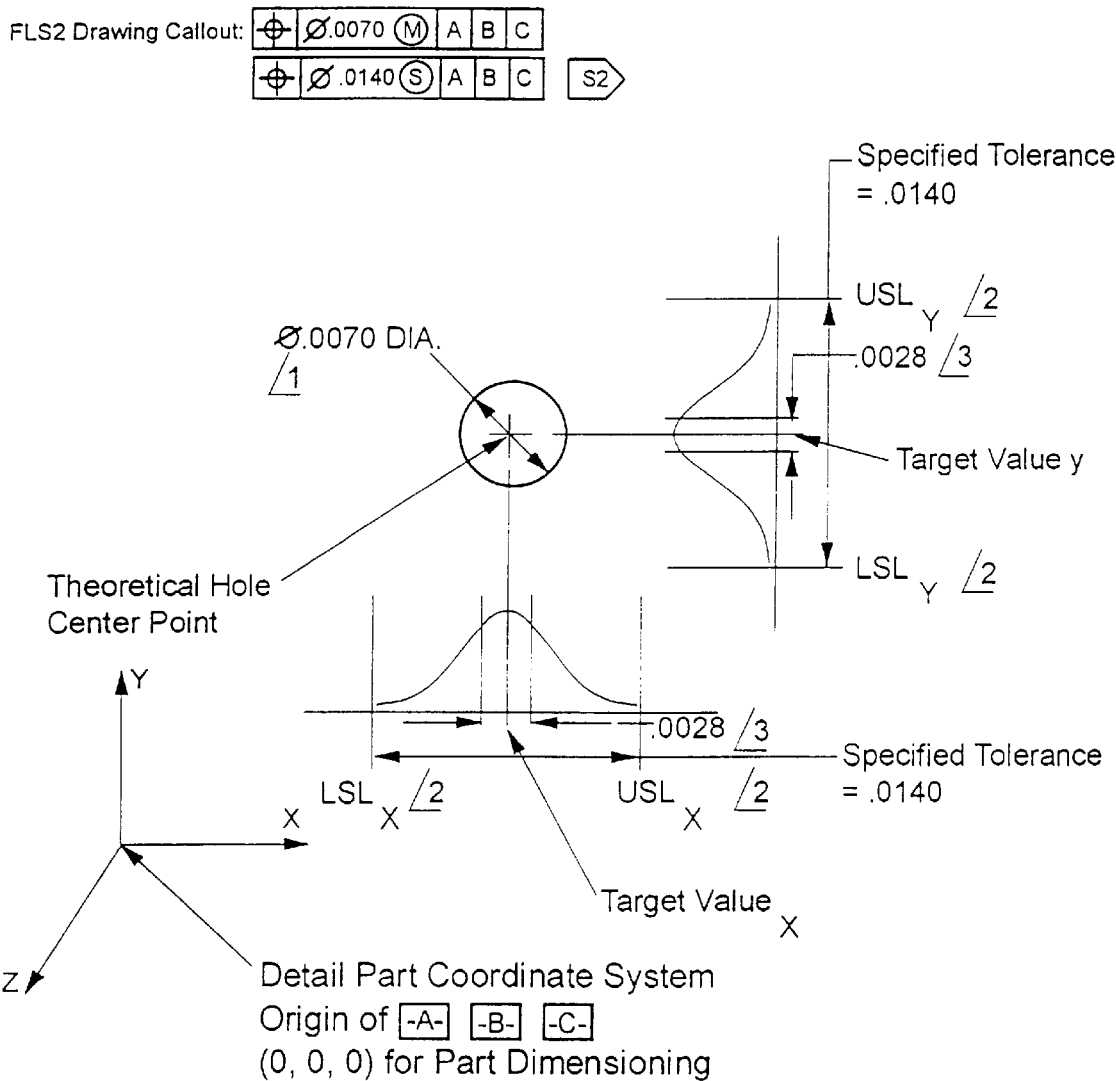
FIGS. 15–17 are illustrations of how to evaluate part feature measurements to the drawing requirements of FIGS. 11 through 13.
Figure 16:
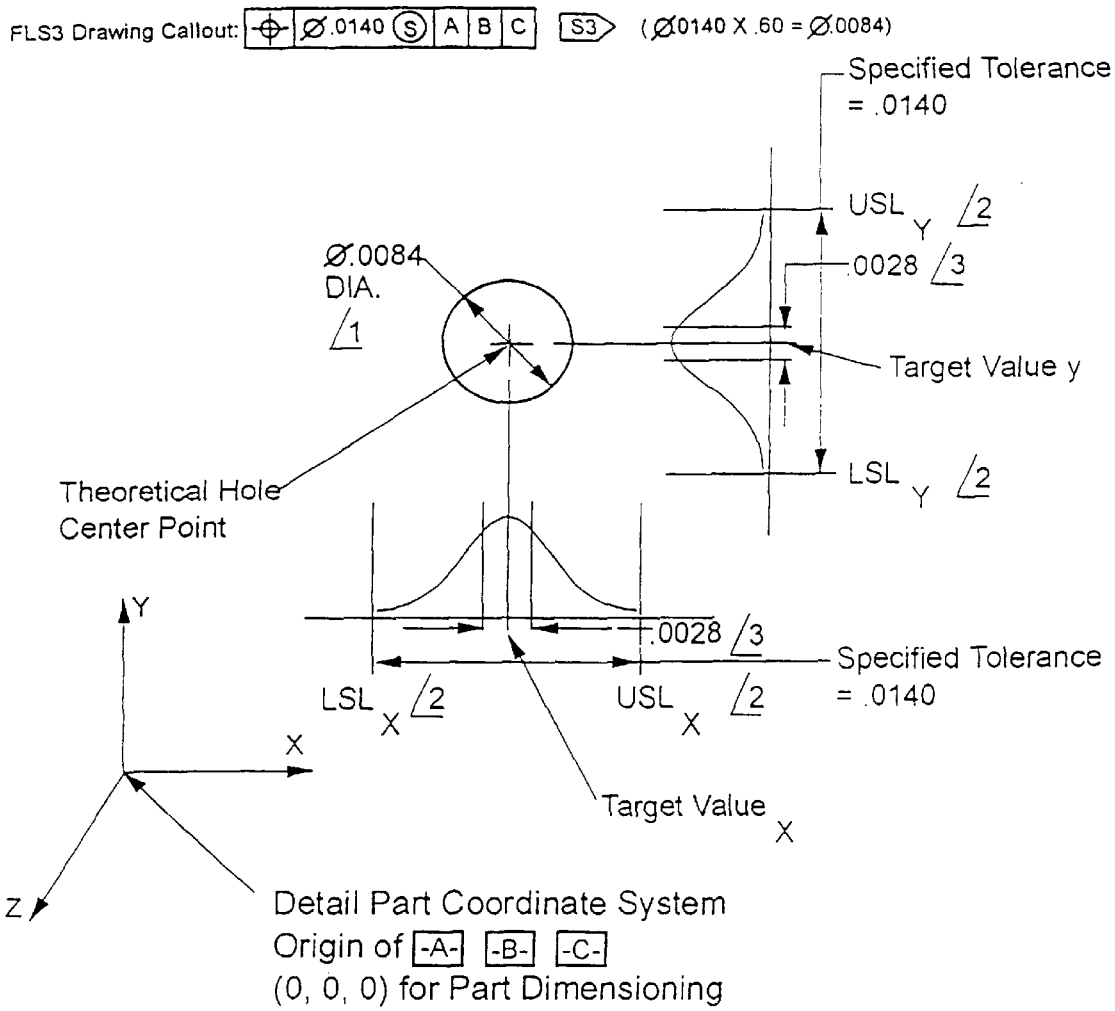
Figure 17:
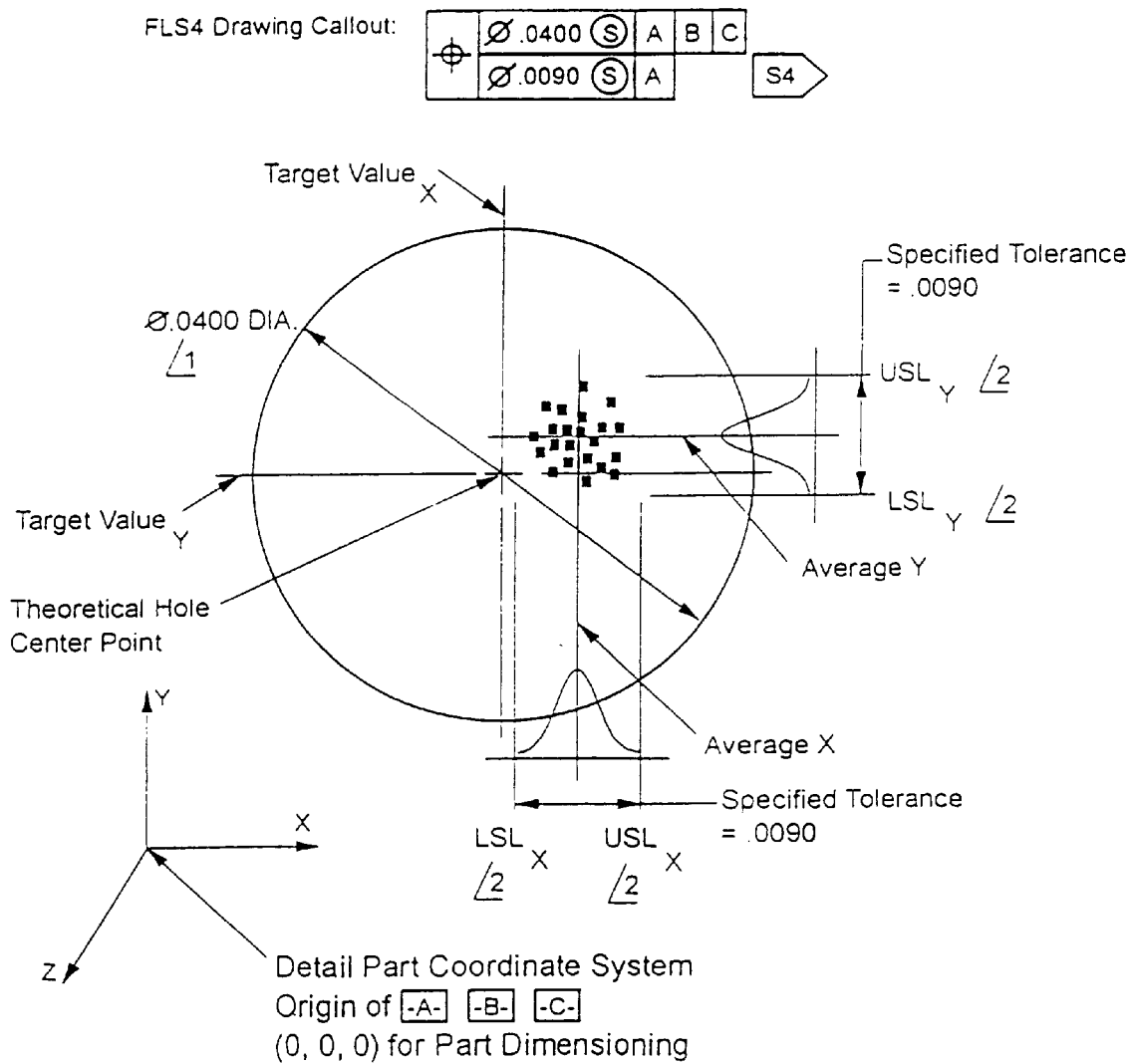

Statistical assessments for control, mean shift, and capability will be accomplished in each applicable axis (X, Y, Z) independently. The translation from a circular tolerance to univariate specification limits is shown in FIGS. 15–17. Statistical tolerances are applicable only to the distribution of measurements for the manufacturing process or a single lot. Individual measurements cannot be rejected for exceeding a statistical tolerance specification limit if the process distribution is acceptable.

The mathematical basis for the analysis and part acceptance techniques as described herein have relied on the use of known production process capabilities. It may still be desirable to use these statistical techniques in order to widen the detail part tolerance limits during initial startup or when changing to a process prior to establishing statistical control. It is acceptable to evaluate parts to these requirements by using a lot acceptance approach and still ensure good assemblies. Lot acceptance is based on evaluation of the short term capability using a lot quality index (LQI) of the lot. LQI is calculated the same as Cpk but does not require that the process be in statistical control. A sample of parts from the production lot is used to estimate the mean shift and LQI of the lot for evaluation to the drawing requirements. After establishing to an acceptable confidence level that the lot meets the requirements, the entire lot is accepted. If the lot fails to meet either the LQI or mean shift requirement, then all parts must be measured. It is acceptable to remove those parts that prevent the rest of the lot from being accepted and to recalculate a new LQI and mean shift based on all the remaining parts.

Obviously, numerous modifications and variations of the preferred embodiment disclosed above will occur to those skilled in the art in view of this specification. Accordingly, it is expressly to be understood that these modifications and variations, and the equivalents thereof, are within the spirit and scope of this invention as defined by the following claims, wherein we claim:

1. A process for establishing valid statistical dimensional tolerance limits, that are enlarged substantially compared to tolerances established by an arithmetic "worst case" approach, for designs of detail parts and will enable accurate prediction of an economically acceptable degree of nonconformance of an end item assembly made from said parts, comprising:
   a) establishing dimensional tolerances for said end item assembly;
   b) initially allocating moieties of said assembly dimensional tolerance among said detail parts to establish a first estimate of detail part tolerances based on reliable detail part fabrication processes that are capable and controlled;
   c) selecting an initially preferred assembly sequence most optimal from a manufacturing standpoint for assembling said parts into said assembly;
   d) determining whether said first estimate of said detail part tolerances are producible within acceptable cost limits for said selected assembly sequence, and if not, selecting on an iterative basis one or more of the following actions:
      i. improve or select alternate detail part fabrication process,
      ii. revise detail part or assembly design or sequence,
      iii. revise said individual part tolerances,
      iv. use assembly tool with hard locators;
   e) establishing verifying processes to ensure that said detail parts are made in accordance with said statistical part dimensional tolerance limits.

2. A process as defined in claim 1, wherein:
said verifying processes include collecting and analyzing selected part dimensional data from a population of parts to determine a Cpk associated with said population, and to determine a shift of a mean value of said dimensional data from nominal dimensions of said parts established in part designs to which said parts are made.

3. A process as defined in claim 2, wherein:
said detail part dimensions have a mean value that is within a predetermined percentage of said nominal dimension in said part design, and detail part dimensional tolerances relate to said assembly tolerances according to the following expression:

$$T_{assy} = M(n)\sqrt{t_1^2 + t_2^2 + \ldots + t_n^2}$$

wherein
$T_{assy}$=said assembly tolerance,
$t_i$=said detail part tolerances of said detail parts,
M(n)=modification factor, and $$M(n) = \frac{.927(1-\eta_0) + \eta_0\sqrt{n} + .927\sqrt{1-\eta_0+\eta_0^2/3} + \eta_0\sqrt{3}}{2}$$

where $\eta_0$ is a preselected mean shift limit band, i.e., $\eta_0$=0.2 for a 10% mean shift limit, and n is the number of tolerances stacked in said assembly.

4. A process as defined in claim 1, wherein:
said detail parts have locating features for accurate placement in said assembly;
whereby said parts are self locating in said assembly with minimal use of hard tooling locators.

5. A process as defined in claim 4, wherein:
said locating features are machined into said detail parts using manufacturing processes having a Cpk≧A and wherein location dimensions of said locating features in said parts have mean values within X % of tolerance ranges of said dimensions established in said detail part design as nominal;
wherein X is less than about 20 and wherein A is at least 1.0, and $$A = \frac{.927\left(1-\eta^* + \sqrt{1-\eta^*+\eta^{*2}/3}\right)}{.927\left(1-\eta_0+\sqrt{1-\eta_0+\eta_0^2/3}\right) + (\eta_0-\eta^*)(\sqrt{n}+\sqrt{3})}$$

with $\eta^*$=2X/100, $\eta_0$ is a preselected mean shift limit band equal to twice the mean shift, and n is the number of tolerances stacked in said assembly.

6. A process for establishing valid statistical detail part dimensional tolerance limits that will enable accurate prediction of an economically acceptable degree of nonconformance of a large flexible assembly made from said parts, comprising:
   a) establishing dimensional tolerances for said assembly;
   b) allocating initial said assembly dimensional tolerance among said detail parts to establish a first estimate of detail part tolerances based on reliable detail part fabrication processes that are capable and controlled;
   c) selecting and validating a preferred assembly sequence for assembling said parts into said assembly;
   d) determining whether said first estimate of said detail part tolerances for said selected assembly sequence are producible within acceptable cost limits, and if not, selecting one or more of the following actions:
      i. improve or select alternate detail part fabrication process,
      ii. revise assembly design or sequence,
      iii. revising said individual part tolerances,
      iv. use assembly tool with hard locators;
   e) reperforming steps b, c, and d until a set of detail part tolerances and assembly sequence is selected, use of which enables said parts to be produced and assembled into said assembly within acceptable cost limits.

7. A process as defined in claim 6, wherein:
said large flexible assembly is an airplane fuselage and said detail parts are fastened together by rivets, bolts, and/or interference fasteners.

8. A process as defined in claim 6, wherein:
said large flexible assembly is an airplane wing and said detail parts are fastened together by fasteners, including rivets, bolts, and/or interference fasteners.

9. A process as defined in claim 6, wherein:
at least some of said detail parts are flexible and have locating features for accurate placement in said assembly;
whereby said parts are self locating in said assembly, without the use of hard tooling locators, by being flexed to position their locating features relative to the locating features of other parts;
said locating features are machined into said detail parts using manufacturing processes having a Cpk≧A and wherein location dimensions of said locating features in said parts have mean values within X % of tolerance ranges of dimensions established in said detail part design as nominal;
wherein X is less than about 20 and wherein A is at least 1.0, and $$A = \frac{.927\left(1 - \eta^* + \sqrt{1 - \eta^* + \eta^{*2}/3}\right)}{.927\left(1 - \eta_0 + \sqrt{1 - \eta_0 + \eta_0^2/3}\right) + (\eta_0 - \eta^*)(\sqrt{n} + \sqrt{3})}$$

with $\eta^* = 2X/100$, $\eta_0$ is a preselected mean shift limit band equal to twice the mean shift, and n is the number of tolerances stacked in said assembly.

10. An assembly having a predetermined set of dimensional tolerances, made from a plurality of parts each having a set of individual tolerances, comprising:
at least two detail parts, each from a separate population of parts with statistically characterized predetermined dimensional tolerances, attached into said assembly;
locating features on adjacent parts for locating said parts relative to each other in said assembly, said locating features fabricated on said parts using mean shift and variation control;
said populations of parts having statistical characterization that determines the acceptability of said populations of parts for use in said assembly.

11. An assembly as defined in claim 10, wherein:
said detail parts are based on part designs having nominal part dimensions, including location dimensions of said locating features in said parts;
said locating features are machined into said detail parts using manufacturing processes having a Cpk≧A and said location dimensions of said locating features in said parts have mean values within a predetermined percentage of tolerance ranges in said detail part design;
wherein X is less than about 20 and wherein A is at least 1.0, and $$A = \frac{.927\left(1 - \eta^* + \sqrt{1 - \eta^* + \eta^{*2}/3}\right)}{.927\left(1 - \eta_0 + \sqrt{1 - \eta_0 + \eta_0^2/3}\right) + (\eta_0 - \eta^*)(\sqrt{n} + \sqrt{3})}$$

with $\eta^* = 2X/100$, $\eta_0$ is a preselected mean shift limit band equal to twice the mean shift, and n is the number of tolerances stacked in said assembly.

12. An assembly as defined in claim 10, wherein:
said detail part dimensions have mean values that are within X % of tolerance ranges in said part design, and detail part dimensional tolerances relate to said assembly tolerance according to the following expression:

$$T_{assy} = M(n)\sqrt{t_1^2 + t_2^2 + \ldots + t_n^2}$$

wherein
$T_{assy}$=said assembly tolerance,
$t_i$=said detail part tolerances of said detail parts,
M(n)=modification factor, and $$M(n) = \frac{.927(1 - \eta_0) + \eta_0\sqrt{n} + .927\sqrt{1 - \eta_0 + \eta_0^2/3} + \eta_0\sqrt{3}}{2}$$

where $\eta_0$ is a preselected mean shift limit band, i.e., $\eta_0$=0.2 for a 10% mean shift limit, and n is the number of tolerances stacked in said assembly.

13. An assembly as defined in claim 12, wherein:
for X is less than or equal to about 20 and n between 2 and 30, the factor M(n) ranges between approximately 1 and 2.

14. An assembly as defined in claim 10, wherein:
said detail parts are accepted for use in said assembly based on statistical analysis of dimensions and location dimensions of said locating features in said parts to determine whether processes used to make said parts are capable and in control, requiring at a minimum that said processes for machining said locating features in said parts have a Cpk at least equal to 1.0; and that said statistically determined dimensions of said locating features in said parts each have mean values that are within 20% of tolerance ranges of said coordination features.

15. A process of assembling large flexible structural assemblies having predetermined assembly dimensional tolerances from a plurality of individual parts, some of which are flexible, while remaining within established preload stress limits of said parts, comprising:
establishing nominal dimensions and predetermined statistical dimensional tolerances for locations of coordination features in said parts;
machining said coordination features in said parts;
locating said parts together relative to each other in desired relative positions primarily using said coordination features as the way of locating the parts in relation to each other instead of hard tooling; and
fastening said parts together in said desired relative positions;
whereby said predetermined statistical dimensional tolerances in said parts are determined as a fabrication requirement for said parts that enables said parts to be economically produced and assembled into assemblies that meet said predetermined assembly dimensional tolerances, said individual part statistical dimensional tolerances being broader than conventional tolerances that are established to ensure acceptable assemblies when parts are assembled at the extremes of their tolerances, stacked in a worst case manner.

16. A process as defined in claim 15, wherein:
said locating features are machined into said detail parts using manufacturing processes having a Cpk≧A and wherein location dimensions of said locating features in said parts have mean values within X % of tolerance ranges of dimensions established in said detail part design as nominal;

wherein X is less than about 20 and wherein A is at least 1.0, and $$A = \frac{.927\left(1 - \eta^* + \sqrt{1 - \eta^* + \eta^{*2}/3}\right)}{.927\left(1 - \eta_0 + \sqrt{1 - \eta_0 + \eta_0^2/3}\right) + (\eta_0 - \eta^*)(\sqrt{n} + \sqrt{3})}$$

with $\eta^* = 2X/100$, $\eta_0$ is a preselected mean shift limit band equal to twice the mean shift, and n is the number of tolerances stacked in said assembly.

17. A process as defined in claim 15, further comprising:
producing said parts in a process that is in control and has a Cpk equal to at least 1.0.

18. A process as defined in claim 15, wherein:
said processes for machining said coordination features in said parts have a Cpk at least equal to 1.0; and
said statistically determined dimensions of said coordination features in said parts each have mean values that are within 20% of tolerance ranges of nominal dimensional location of said coordination features.

19. A process as defined in claim 15, wherein:
each set of dimensions of said coordination features has a mean value that is within a predetermined percentage of tolerance ranges of said nominal dimension in said part design, and detail part dimensional tolerances relate to said assembly tolerances according to the following expression:

$$T_{assy} = M(n)\sqrt{t_1^2 + t_2^2 + \ldots + t_n^2}$$

wherein $T_{assy}$=said assembly tolerance,
$t_i$=said detail part tolerances of said detail parts,
M(n)=modification factor, and $$M(n) = \frac{.927(1 - \eta_0) + \eta_0\sqrt{n} + .927\sqrt{1 - \eta_0 + \eta_0^2/3} + \eta_0\sqrt{3}}{2}$$

where $\eta_0$ is a preselected mean shift limit band equal to twice said mean shift limit, and n is the number of tolerances stacked in said assembly.

20. A process of assembling a large flexible structure, having a set of predetermined dimensional tolerances, from a plurality of individual parts, some of which are flexible, while remaining within preestablished stress limits of said parts, comprising:
selecting and validating a preferred assembly sequence for assembling said parts into said assembly;
selecting locations, numbers and size of coordination features to be machined in said detail parts by which said parts are located relative to each other and fastened together to form said assembly;
establishing individual part statistical dimensional tolerances as a fabrication requirement for said parts that enables said parts to be economically produced and assembled into assemblies that meet said predetermined assembly dimensional tolerances, said individual part statistical dimensional tolerances being broader than conventional tolerances that are established to ensure acceptable assemblies when parts are assembled at the extremes of their tolerances, stacked in a worst case manner;
producing said parts to said individual statistical dimensional tolerances in a capable process, having a Cpk equal to at least 1.0, and assembling said parts in accordance with said preferred assembly sequence by locating said parts relative to each other by reference to said coordination features and fastening said parts together as located, using said coordination features as the primary determinator of assembly configuration.

21. A process as defined in claim 20, wherein:
said statistically determined dimensions of said individual parts have mean values that are within 10% of tolerance ranges of nominal dimensional locations of said individual parts.

22. A process of assembling a large flexible assembly from a plurality of individual parts, some of which are flexible, while remaining within predetermined dimensional tolerances of said structure and within preestablished stress limits of said parts, comprising:
selecting and validating a preferred assembly sequence for assembling said parts into said assembly;
selecting locations, numbers and sizes of coordination features to be machined in said detail parts by which said parts are located relative to each other and fastened together to form said assembly;
establishing statistical dimensional tolerances for individual parts as a fabrication requirement for said individual parts that enables said parts to be economically produced and assembled into assemblies that meet said predetermined dimensional assembly tolerances, said statistical dimensional tolerances for individual parts being broader than conventional tolerances that are established to ensure acceptable assemblies when parts are assembled at the extremes of their tolerances, stacked in a worst case manner;
producing a lot of one of said individual parts by an uncontrolled process, and measuring a sample of said parts from said lot to a confidence level acceptable for calculating a lot quality index and mean shift for said lot;
calculating said lot quality index and said means shift mean for said part in said lot based on measurement of said sample; and
removing enough of said parts from said lot near the limit of said tolerance to bring the mean dimension of parts remaining in said group to within a predetermined percentage of the prescribed mean of the tolerance for that dimension and bring said remaining parts in the lot to an acceptable level of short term capability.

23. A process of ensuring an accurate assembly made from parts assembled with minimal use of hard tooling, at least some of which parts are flexible, comprising:
establishing dimensions and valid tolerance requirements for said assembly;
using said established assembly tolerance requirements, allocate detail part tolerances to limit dimensional non-conformance of said assembly to an economically acceptable probability;
applying a set of drawing requirements necessary to ensure compliance with statistical limits established by analysis;
applying a detail part verification process to assure compliance to said limits, wherein said part verification process includes collecting and analyzing selected part dimensional data from populations of parts for use in said assembly to determine a Cpk associated with said populations, and to determine a shift of a mean value of said dimensional data from nominal dimensions of said parts established in part designs to which said parts are made; and accepting for use in said assembly a first set of parts populations which have a Cpk at least equal to 1.0 and a mean shift at most equal to 20%.

24. A process as defined in claim 23, wherein:

said part dimensional data of said first set of parts populations have a value within X % of tolerance ranges of dimensions established in said detail part design as nominal;

wherein X is less than about 20 and wherein A is at least 1.0, and $$A = \frac{.927\left(1 - \eta^* + \sqrt{1 - \eta^* + \eta^{*2}/3}\right)}{.927\left(1 - \eta_0 + \sqrt{1 - \eta_0 + \eta_0^2/3}\right) + (\eta_0 - \eta^*)(\sqrt{n} + \sqrt{3})}$$

with $\eta^* = 2X/100$. Here $\eta_0$ is a preselected mean shift limit band, i.e., $\eta_0 = 0.2$ for a 10% mean shift, and n is the number of tolerances stacked in said assembly.

25. A process as defined in claim 24, wherein:

said part verification process further includes measuring a sample of a second set of parts populations, remaining outside of said first set of parts populations, and removing enough of said remaining parts near the limit of said tolerance to bring the mean dimension of the remaining parts to within a predetermined percentage of the prescribed mean of the tolerance for that dimension and bring the remaining parts in the lot to an acceptable level of short term capability.

26. A detail part from a population of parts with statistically characterized predetermined dimensional tolerances, having a predetermined set of dimensional tolerances for attachment into an assembly having predetermined assembly tolerances from which said detail part tolerances was derived, comprising:

locating features on said part for locating said part in said assembly, said locating features fabricated on said part using mean shift and variation control;

said population of parts having statistical characterization that determines the acceptability of said parts from said population for use in said assembly.

* * * * *